US012091016B2

(12) United States Patent
Mangal et al.

(10) Patent No.: US 12,091,016 B2
(45) Date of Patent: Sep. 17, 2024

(54) VEHICLE ROUTE MODIFICATION TO IMPROVE VEHICLE LOCATION INFORMATION

(71) Applicant: Aptiv Technologies AG, Schaffhausen (CH)

(72) Inventors: Nandita Mangal, Los Altos, CA (US); Michael H. Laur, Mission Viejo, CA (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/811,434

(22) Filed: Jul. 8, 2022

(65) Prior Publication Data

US 2022/0340139 A1  Oct. 27, 2022

Related U.S. Application Data

(63) Continuation of application No. 16/575,048, filed on Sep. 18, 2019, now Pat. No. 11,447,134.

(51) Int. Cl.
*B60W 30/18* (2012.01)
*G05D 1/00* (2006.01)
*G06V 20/56* (2022.01)
*G06V 20/58* (2022.01)

(52) U.S. Cl.
CPC ..... *B60W 30/18163* (2013.01); *G05D 1/0088* (2013.01); *G05D 1/0223* (2013.01); *G06V 20/584* (2022.01); *G06V 20/588* (2022.01); *B60W 2554/80* (2020.02); *B60W 2556/50* (2020.02)

(58) Field of Classification Search
CPC ................. B60W 30/18163; G05D 1/0088
See application file for complete search history.

(56) References Cited

U.S. PATENT DOCUMENTS

| | | | |
|---|---|---|---|
| 6,249,245 B1 | 6/2001 | Watters et al. | |
| 9,371,072 B1* | 6/2016 | Sisbot | G06V 20/58 |
| 9,870,001 B1 | 1/2018 | Mangal et al. | |
| 10,317,220 B2 | 6/2019 | Laur et al. | |
| 10,609,515 B1 | 3/2020 | Bender et al. | |
| 2010/0169006 A1 | 7/2010 | Ueda et al. | |
| 2011/0282577 A1 | 11/2011 | Kang et al. | |
| 2012/0089319 A1 | 4/2012 | Basnayake | |
| 2014/0379252 A1 | 12/2014 | Sorokin et al. | |
| 2017/0242132 A1 | 8/2017 | Kim | |
| 2018/0004223 A1 | 1/2018 | Baldwin | |
| 2018/0039268 A1 | 2/2018 | Mangal et al. | |
| 2018/0067966 A1* | 3/2018 | Oder | G05D 1/0276 |
| 2018/0373941 A1* | 12/2018 | Kwant | G08G 1/0145 |

(Continued)

*Primary Examiner* — Jess Whittington
(74) *Attorney, Agent, or Firm* — Harness, Dickey & Pierce, P.L.C.

(57) ABSTRACT

An illustrative example embodiment of a system for controlling a vehicle includes at least one sensor configured to detect at least one localization reference and at least one processor configured to determine a location of the vehicle with a first precision based on an indication from the at least one sensor while the vehicle is traveling in a first lane of a roadway. The processor is configured to determine that at least one characteristic of the first precision is below a threshold and, based on the at least one characteristic being below the threshold, maneuver the vehicle to a second lane of the roadway.

15 Claims, 17 Drawing Sheets

(56) References Cited

U.S. PATENT DOCUMENTS

| | | |
|---|---|---|
| 2019/0019413 A1* | 1/2019 | Yun .................. B60W 60/0053 |
| 2019/0063927 A1 | 2/2019 | Laur et al. |
| 2019/0088125 A1 | 3/2019 | Park et al. |
| 2019/0094880 A1 | 3/2019 | Agarwal et al. |
| 2019/0101929 A1 | 4/2019 | Baldwin |
| 2019/0250618 A1* | 8/2019 | Batts .................... G05D 1/0231 |
| 2020/0062252 A1* | 2/2020 | Parks ...................... G06F 16/29 |
| 2020/0223449 A1 | 7/2020 | Tsuji et al. |
| 2020/0272832 A1* | 8/2020 | Urano .................... G08G 1/167 |
| 2021/0056852 A1* | 2/2021 | Lund ........................ G08G 1/04 |
| 2021/0294340 A1 | 9/2021 | Zhou et al. |

\* cited by examiner

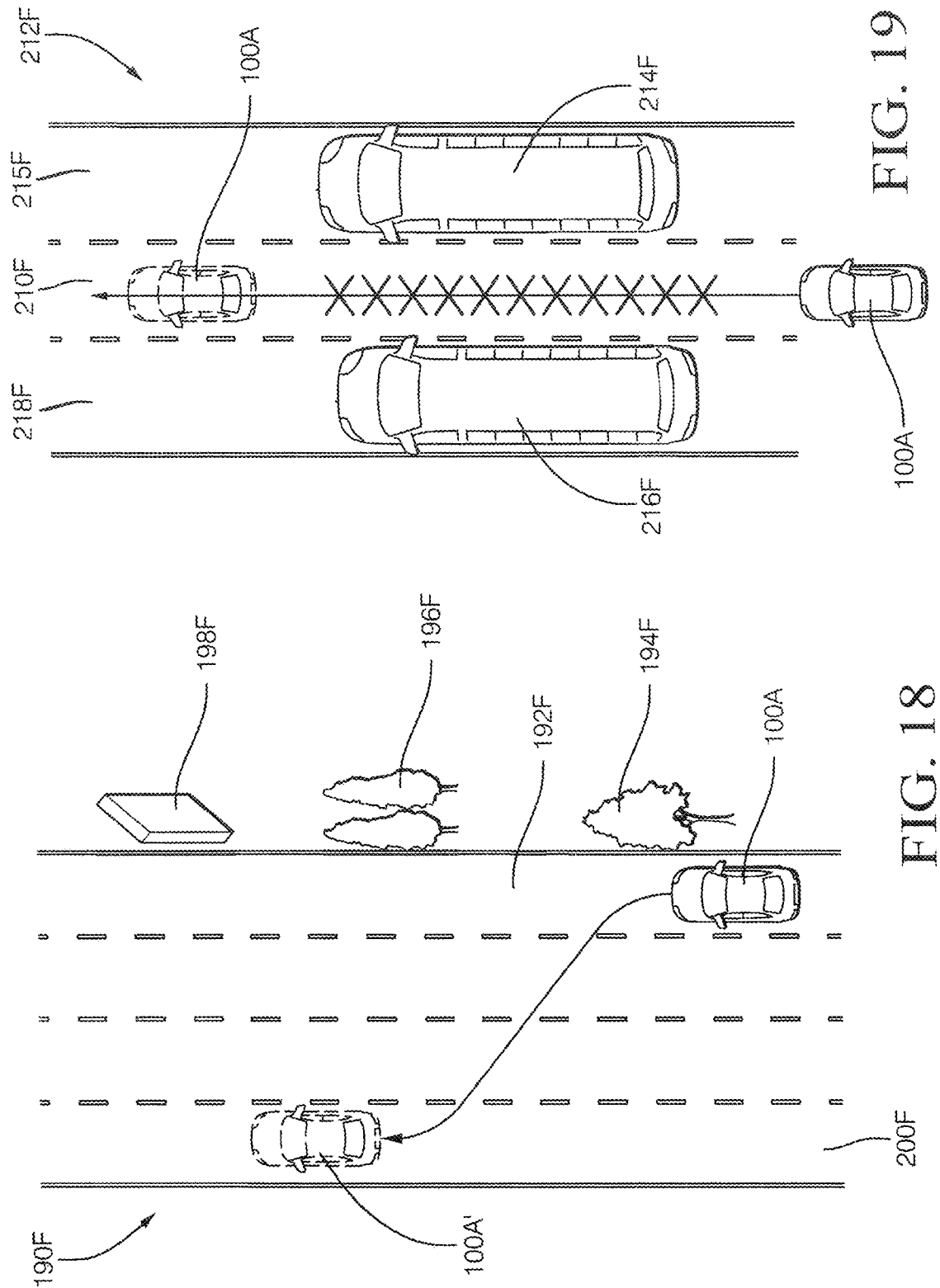

VEHICLE ROUTE MODIFICATION TO IMPROVE VEHICLE LOCATION INFORMATION

CROSS-REFERENCE TO RELATED APPLICATION

This application is a continuation of U.S. patent application Ser. No. 16/575,048, filed Sep. 18, 2019, which is incorporated by reference herein in its entirety.

TECHNICAL FIELD

This description relates to modifying a vehicle route to improve vehicle location information.

BACKGROUND

Autonomous vehicles can travel without requiring a human driver. There are various technologies involved in controlling the vehicle to follow a route to an intended destination. One aspect of controlling the vehicle includes determining the vehicle location along the route. Existing technologies for determining the vehicle location are based on, for example, information from GNSS satellite signals, map data, and on-vehicle sensor observation of the environment near the vehicle. While such technologies are useful, there are situations in which the availability of such information is limited resulting in potentially decreased precision in vehicle location information.

SUMMARY

An illustrative example embodiment of a system for controlling a vehicle includes at least one sensor configured to detect at least one localization reference and at least one processor configured to determine a location of the vehicle with a first precision based on an indication from the at least one sensor while the vehicle is traveling in a first lane of a roadway. The processor is configured to determine that at least one characteristic of the first precision is below a threshold and, based on the at least one characteristic being below the threshold, maneuver the vehicle to a second lane of the roadway.

An illustrative example embodiment of a computer-implemented method includes determining a location of a vehicle with a first precision based on at least one localization reference while the vehicle, which includes at least one processor and at least one sensor, is traveling in a first lane of a roadway. The method includes determining that the first precision has at least one characteristic that is below a threshold and, based on the first precision being below the threshold, maneuvering the vehicle, using the at least one processor, to a second lane of the roadway.

Another illustrative example embodiment of a system for controlling a vehicle includes at least one sensor configured to detect at least one localization reference. A processor is configured to determine that at least one obstruction near the vehicle is preventing the at least one sensor from detecting the at least one localization reference while the vehicle is traveling in a lane of a roadway and, based on the determination, alter a speed of the vehicle while in the lane to change a position of the vehicle relative to the obstruction until the obstruction no longer prevents the sensor from detecting the at least one localization.

These and other aspects, features, and implementations can be expressed as methods, apparatus, systems, components, program products, means or steps for performing a function, and in other ways.

These and other aspects, features, and implementations will become apparent from the following descriptions, including the claims.

BRIEF DESCRIPTION OF THE DRAWINGS

FIG. 18 schematically illustrates an example scenario including maneuvering a vehicle to improve a vehicle location determination based on satellite signals.

FIG. 19 schematically illustrates another example scenario including maneuvering a vehicle to improve a vehicle location determination based on satellite signals.

DETAILED DESCRIPTION

Figure 1:
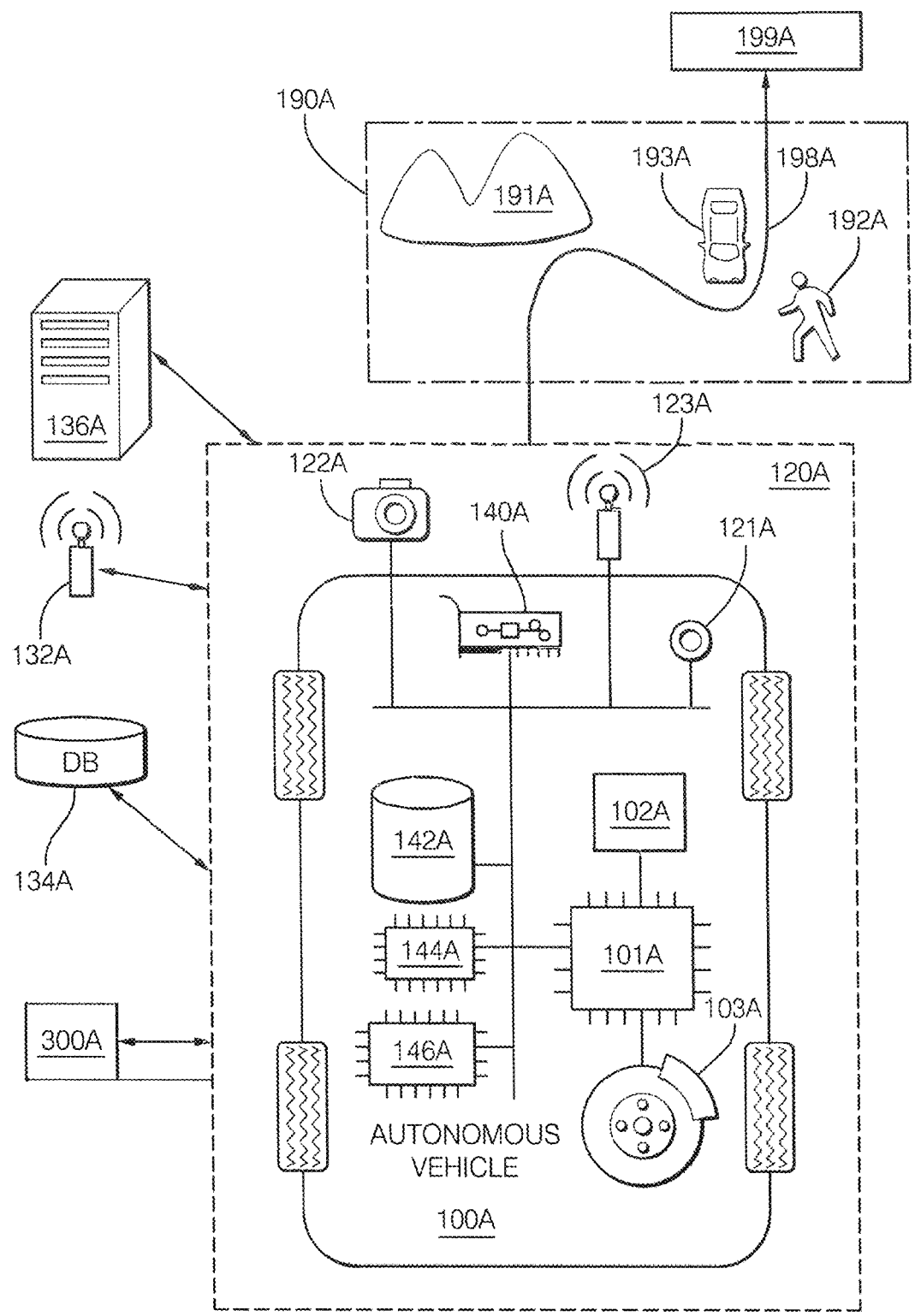
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to effect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:
1. General Overview
2. System Overview
3. Autonomous Vehicle Architecture
4. Autonomous Vehicle Inputs
5. Autonomous Vehicle Planning
6. Autonomous Vehicle Control
7. Autonomous Vehicle Route Modification General Overview Embodiments disclosed in this description provide improved vehicle location by, for example, maneuvering the vehicle into a different lane on a roadway to increase the amount of localization reference information available for determining the location of the vehicle. Some example embodiments include maneuvering the vehicle out of a lane that lacks sufficient lane markings to demarcate the lane into another lane where better lane markings are present. Other example embodiments include maneuvering the vehicle out of a lane where an obstruction hinders reception or detection of a GPS satellite signal into another lane where the signal is detectable.

System Overview

FIG. 1A shows an example of an autonomous vehicle 100A having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300A described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120A operates the AV 100A along a trajectory 198A through an environment 190A to a destination 199A (sometimes referred to as a final location) while avoiding objects (e.g., natural obstructions 191A, vehicles 193A, pedestrians 192A, cyclists, and other obstacles) and obeying rules of the road (e.g., rules of operation or driving preferences).

In an embodiment, the AV system 120A includes devices 101A that are instrumented to receive and act on operational commands from the computer processors 146A. In an embodiment, computing processors 146A are similar to the processor 304A described below in reference to FIG. 3. Examples of devices 101A include a steering control 102A, brakes 103A, gears, accelerator pedal or other acceleration control mechanisms, windshield wipers, side-door locks, window controls, and turn-indicators.

In an embodiment, the AV system 120A includes sensors 121A for measuring or inferring properties of state or condition of the AV 100A, such as the AV's position, linear and angular velocity and acceleration, and heading (e.g., an orientation of the leading end of AV 100A). Example of sensors 121A are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121A also include sensors for sensing or measuring properties of the AV's environment. For example, monocular or stereo video cameras 122A in the visible light, infrared or thermal (or both) spectra, LiDAR 123A, RADAR, ultrasonic sensors, time-of-flight (TOF) depth sensors, speed sensors, temperature sensors, humidity sensors, and precipitation sensors.

In an embodiment, the AV system 120A includes a data storage unit 142A and memory 144A for storing machine instructions associated with computer processors 146A or data collected by sensors 121A. In an embodiment, the data storage unit 142A is similar to the ROM 308A or storage device 310A described below in relation to FIG. 3A. In an embodiment, memory 144A is similar to the main memory 306A described below. In an embodiment, the data storage unit 142A and memory 144A store historical, real-time, and/or predictive information about the environment 190A. In an embodiment, the stored information includes maps, driving performance, traffic congestion updates or weather conditions. In an embodiment, data relating to the environment 190A is transmitted to the AV 100A via a communications channel from a remotely located database 134A.

In an embodiment, the AV system 120A includes communications devices 140A for communicating measured or inferred properties of other vehicles' states and conditions, such as positions, linear and angular velocities, linear and angular accelerations, and linear and angular headings to the AV 100A. These devices include Vehicle-to-Vehicle (V2V) and Vehicle-to-Infrastructure (V2I) communication devices and devices for wireless communications over point-to-point or ad hoc networks or both. In an embodiment, the communications devices 140A communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140A include communication interfaces. For example, wired, wireless, WiMAX, Wi-Fi, Bluetooth, satellite, cellular, optical, near field, infrared, or radio interfaces. The communication interfaces transmit data from a remotely located database 134A to AV system 120A. In an embodiment, the remotely located database 134A is embedded in a cloud computing environment 200A as described in FIG. 2. The communication interfaces 140A transmit data collected from sensors 121A or other data related to the operation of AV 100A to the remotely located database 134A. In an embodiment, communication interfaces 140A transmit information that relates to teleoperations to the AV 100A. In some embodiments, the AV 100A communicates with other remote (e.g., "cloud") servers 136A.

In an embodiment, the remotely located database 134A also stores and transmits digital data (e.g., storing data such as road and street locations). Such data is stored on the memory 144A on the AV 100A, or transmitted to the AV 100A via a communications channel from the remotely located database 134A.

In an embodiment, the remotely located database 134A stores and transmits historical information about driving properties (e.g., speed and acceleration profiles) of vehicles that have previously traveled along trajectory 198A at similar times of day. In one implementation, such data may be stored on the memory 144A on the AV 100A, or transmitted to the AV 100A via a communications channel from the remotely located database 134A.

Computing devices 146A located on the AV 100A algorithmically generate control actions based on both real-time sensor data and prior information, allowing the AV system 120A to execute its autonomous driving capabilities.

In an embodiment, the AV system 120A includes computer peripherals 132A coupled to computing devices 146A for providing information and alerts to, and receiving input from, a user (e.g., an occupant or a remote user) of the AV 100A. In an embodiment, peripherals 132A are similar to the display 312A, input device 314A, and cursor controller 316A discussed below in reference to FIG. 3. The coupling is wireless or wired. Any two or more of the interface devices may be integrated into a single device.

Figure 2:
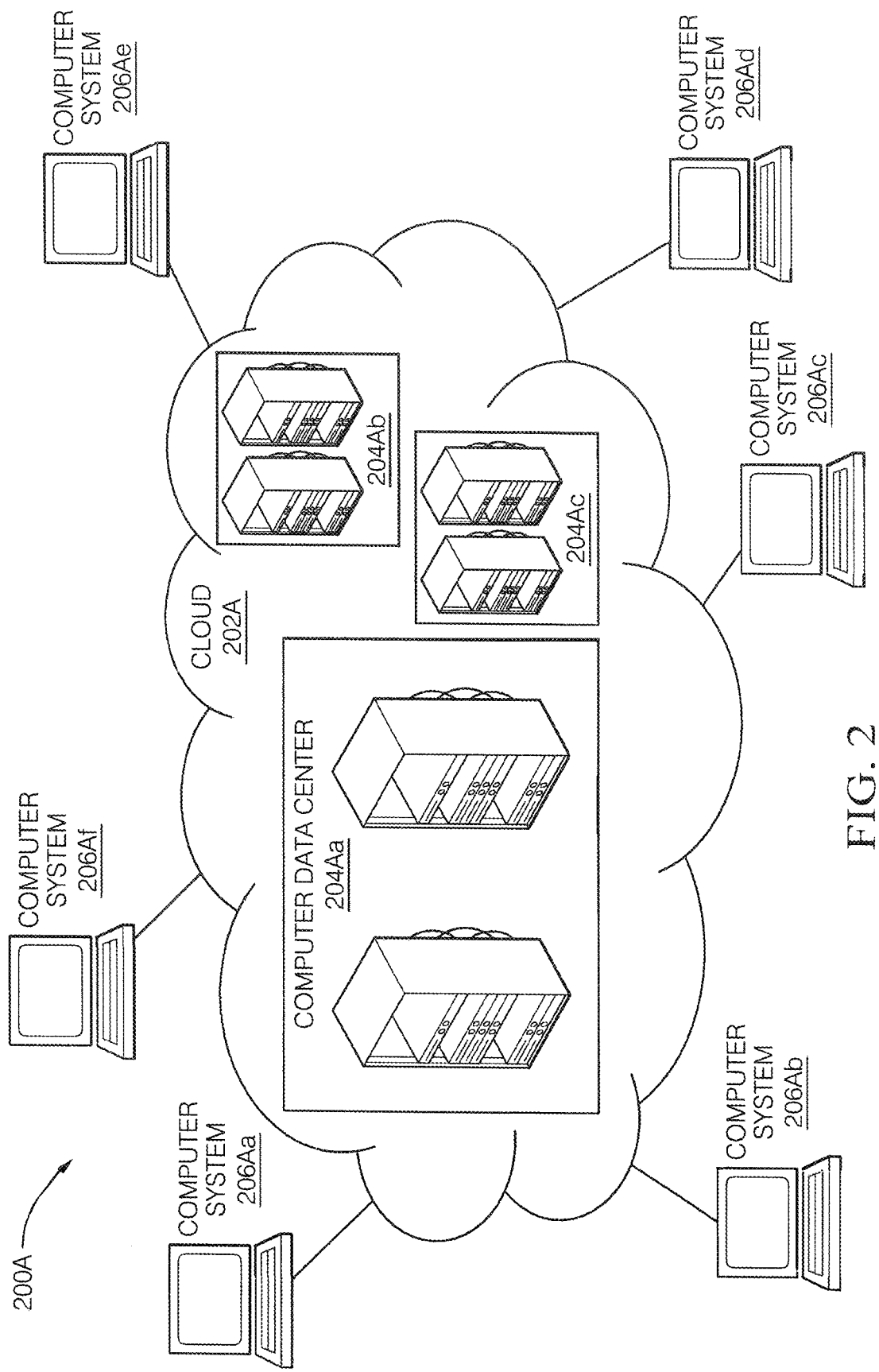
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200A includes cloud data centers 204Aa, 204Ab, and 204Ac that are interconnected through the cloud 202A. Data centers 204Aa, 204Ab, and 204Ac provide cloud computing services to computer systems 206Aa, 206Ab, 206Ac, 206Ad, 206Ae, and 206Af connected to cloud 202A.

The cloud computing environment 200A includes one or more cloud data centers. In general, a cloud data center, for example the cloud data center 204Aa shown in FIG. 2A, refers to the physical arrangement of servers that make up a cloud, for example the cloud 202A shown in FIG. 2A, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3A. The data center 204Aa has many computing systems distributed through many racks.

The cloud 202A includes cloud data centers 204Aa, 204Ab, and 204Ac along with the network and networking resources (for example, networking equipment, nodes, routers, switches, and networking cables) that interconnect the cloud data centers 204Aa, 204Ab, and 204Ac and help facilitate the computing systems' 206Aa-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206Aa-f or cloud computing services consumers are connected to the cloud 202A through network links and network adapters. In an embodiment, the computing systems 206Aa-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206Aa-f are implemented in or as a part of other systems.

Figure 3:
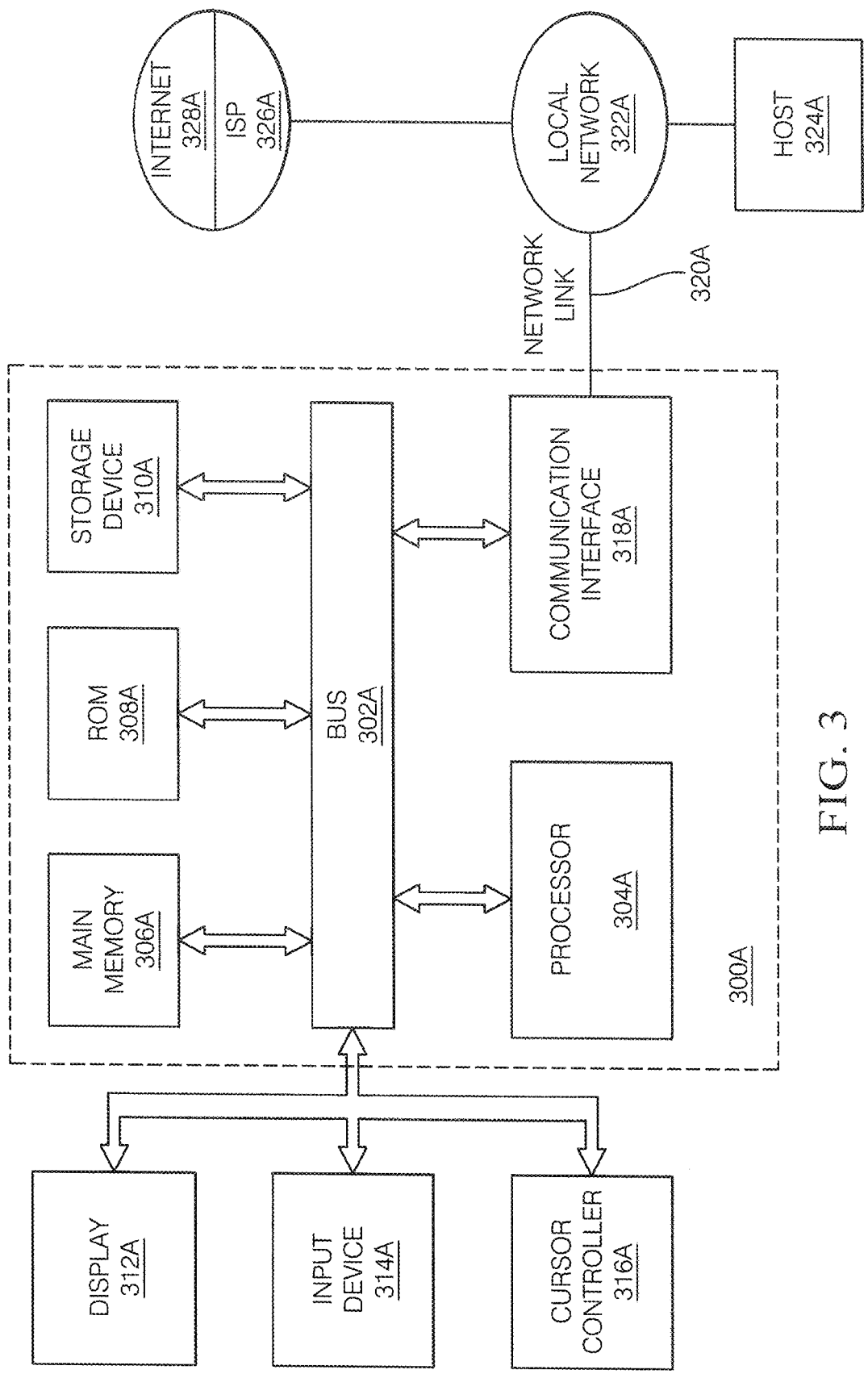
FIG. 3 illustrates a computer system.

FIG. 3 illustrates a computer system 300A. In an implementation, the computer system 300A is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300A includes a bus 302A or other communication mechanism for communicating information, and a hardware processor 304A coupled with a bus 302A for processing information. The hardware processor 304A is, for example, a general-purpose microprocessor. The computer system 300A also includes a main memory 306A, such as a random-access memory (RAM) or other dynamic storage device, coupled to the bus 302A for storing information and instructions to be executed by processor 304A. In one implementation, the main memory 306A is used for storing temporary variables or other intermediate information during execution of instructions to be executed by the processor 304A. Such instructions, when stored in non-transitory storage media accessible to the processor 304A, render the computer system 300A into a special-purpose machine that is customized to perform the operations specified in the instructions.

In an embodiment, the computer system 300A further includes a read only memory (ROM) 308A or other static storage device coupled to the bus 302A for storing static information and instructions for the processor 304A. A storage device 310A, such as a magnetic disk, optical disk, solid-state drive, or three-dimensional cross point memory is provided and coupled to the bus 302A for storing information and instructions.

In an embodiment, the computer system 300A is coupled via the bus 302A to a display 312A, such as a cathode ray tube (CRT), a liquid crystal display (LCD), plasma display, light emitting diode (LED) display, or an organic light emitting diode (OLED) display for displaying information to a computer user. An input device 314A, including alphanumeric and other keys, is coupled to bus 302A for communicating information and command selections to the processor 304A. Another type of user input device is a cursor controller 316A, such as a mouse, a trackball, a touch-enabled display, or cursor direction keys for communicating direction information and command selections to the processor 304A and for controlling cursor movement on the display 312A. This input device typically has two degrees of freedom in two axes, a first axis (e.g., x-axis) and a second axis (e.g., y-axis), that allows the device to specify positions in a plane.

According to one embodiment, the techniques herein are performed by the computer system 300A in response to the processor 304A executing one or more sequences of one or more instructions contained in the main memory 306A. Such instructions are read into the main memory 306A from another storage medium, such as the storage device 310A. Execution of the sequences of instructions contained in the main memory 306A causes the processor 304A to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310A. Volatile media includes dynamic memory, such as the main memory 306A. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302A. Transmission media can also take the form of acoustic or light waves, such as those generated during radio-wave and infrared data communications.

In an embodiment, various forms of media are involved in carrying one or more sequences of one or more instructions to the processor 304A for execution. For example, the instructions are initially carried on a magnetic disk or solid-state drive of a remote computer. The remote computer loads the instructions into its dynamic memory and send the instructions over a telephone line using a modem. A modem local to the computer system 300A receives the data on the telephone line and use an infrared transmitter to convert the data to an infrared signal. An infrared detector receives the data carried in the infrared signal and appropriate circuitry places the data on the bus 302A. The bus 302A carries the data to the main memory 306A, from which processor 304A retrieves and executes the instructions. The instructions received by the main memory 306A may optionally be stored on the storage device 310A either before or after execution by processor 304A.

The computer system 300A also includes a communication interface 318A coupled to the bus 302A. The communication interface 318A provides a two-way data communication coupling to a network link 320A that is connected to a local network 322A. For example, the communication interface 318A is an integrated service digital network (ISDN) card, cable modem, satellite modem, or a modem to provide a data communication connection to a corresponding type of telephone line. As another example, the communication interface 318A is a local area network (LAN) card to provide a data communication connection to a compatible LAN. In some implementations, wireless links are also implemented. In any such implementation, the communication interface 318A sends and receives electrical, electromagnetic, or optical signals that carry digital data streams representing various types of information.

The network link 320A typically provides data communication through one or more networks to other data devices. For example, the network link 320A provides a connection through the local network 322A to a host computer 324A or to a cloud data center or equipment operated by an Internet Service Provider (ISP) 326A. The ISP 326A in turn provides data communication services through the world-wide packet data communication network now commonly referred to as the "Internet" 328A. The local network 322A and Internet 328A both use electrical, electromagnetic or optical signals that carry digital data streams. The signals through the various networks and the signals on the network link 320A and through the communication interface 318A, which carry the digital data to and from the computer system 300A, are example forms of transmission media. In an embodiment, the network 320A contains the cloud 202A or a part of the cloud 202A described above.

The computer system 300A sends messages and receives data, including program code, through the network(s), the network link 320A, and the communication interface 318A. In an embodiment, the computer system 300A receives code for processing. The received code is executed by the processor 304A as it is received, and/or stored in storage device 310A, or other non-volatile storage for later execution.

Autonomous Vehicle Architecture

Figure 4:
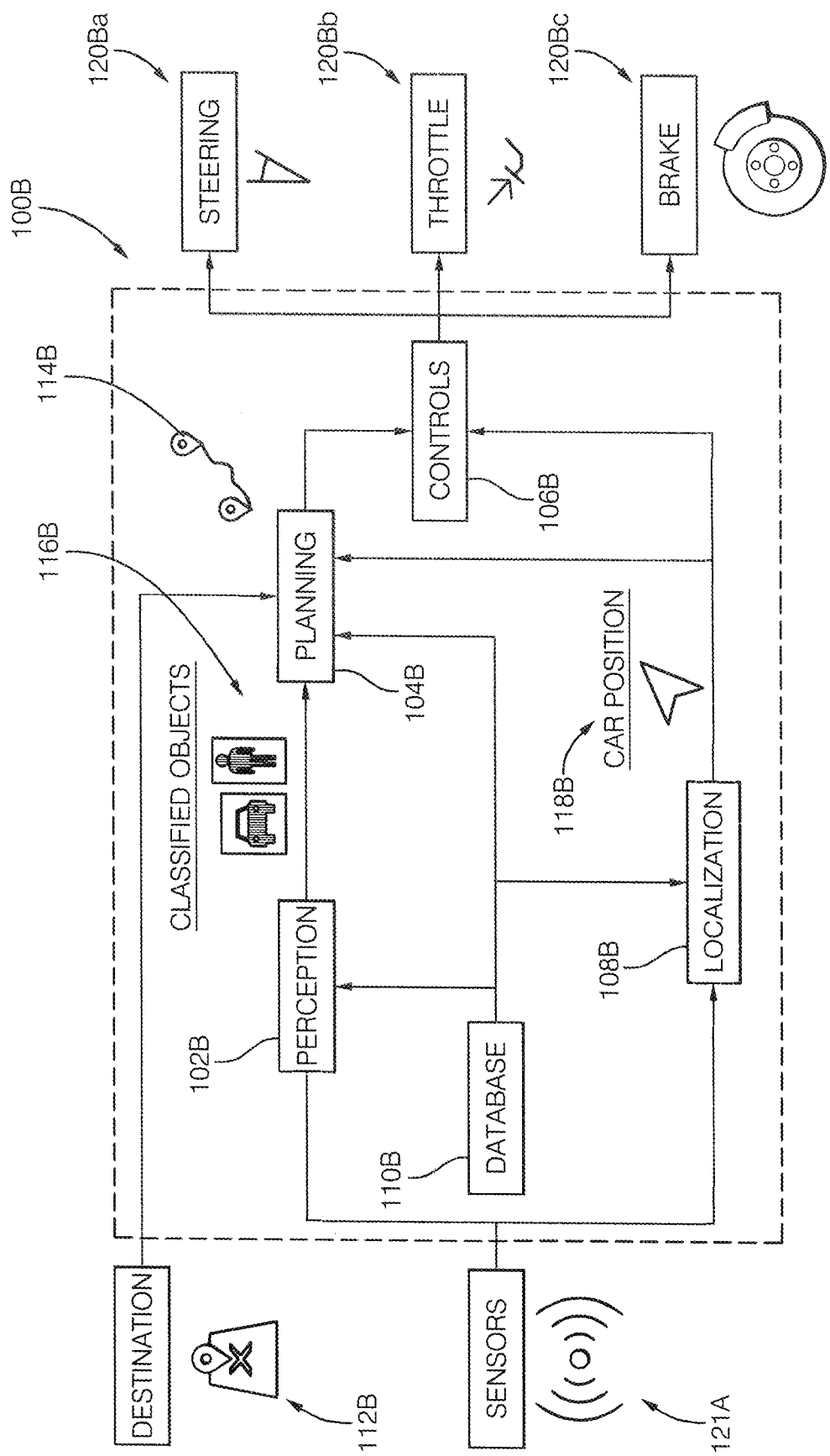
FIG. 4 shows an example architecture for an autonomous vehicle.

FIG. 4 shows an example architecture 100B for an autonomous vehicle (e.g., the AV 100A shown in FIG. 1). The architecture 100B includes a perception module 102B (sometimes referred to as a perception circuit), a planning module 104B (sometimes referred to as a planning circuit), a control module 106B (sometimes referred to as a control circuit), a localization module 108B (sometimes referred to as a localization circuit), and a database module 110B (sometimes referred to as a database circuit). Each module plays a role in the operation of the AV 100A. Together, the modules 102B, 104B, 106B, 108B, and 110B may be part of the AV system 120A shown in FIG. 1. In some embodiments, any of the modules 102B, 104B, 106B, 108B, and 110B is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 102B, 104B, 106B, 108B, and 110B is sometimes referred to as a processing circuit (e.g., computer hardware, computer software, or a combination of the two). A combination of any or all of the modules 102B, 104B, 106B, 108B, and 110B is also an example of a processing circuit.

In use, the planning module 104B receives data representing a destination 112B and determines data representing a trajectory 114B (sometimes referred to as a route) that can be traveled by the AV 100A to reach (e.g., arrive at) the destination 112B. In order for the planning module 104B to determine the data representing the trajectory 114B, the planning module 104B receives data from the perception module 102B, the localization module 108B, and the database module 110B.

The perception module 102B identifies nearby physical objects using one or more sensors 121A, e.g., as also shown in FIG. 1A. The objects are classified (e.g., grouped into types such as pedestrian, bicycle, automobile, traffic sign, etc.) and a scene description including the classified objects 116B is provided to the planning module 104B.

The planning module 104B also receives data representing the AV position 118B from the localization module 108B. The localization module 108B determines the AV position by using data from the sensors 121A and data from the database module 110B (e.g., a geographic data) to calculate a position. For example, the localization module 108B uses data from a GNSS (Global Navigation Satellite System) sensor and geographic data to calculate a longitude and latitude of the AV. In an embodiment, data used by the localization module 108B includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 106B receives the data representing the trajectory 114B and the data representing the AV position 118B and operates the control functions 120Ba-c (e.g., steering, throttling, braking, ignition) of the AV in a manner that will cause the AV 100A to travel the trajectory 114B to the destination 112B. For example, if the trajectory 114B includes a left turn, the control module 106B will operate the control functions 120Ba-c in a manner such that the steering angle of the steering function will cause the AV 100A to turn left and the throttling and braking will cause the AV 100A to pause and wait for passing pedestrians or vehicles before the turn is made.

Autonomous Vehicle Inputs

Figure 5:
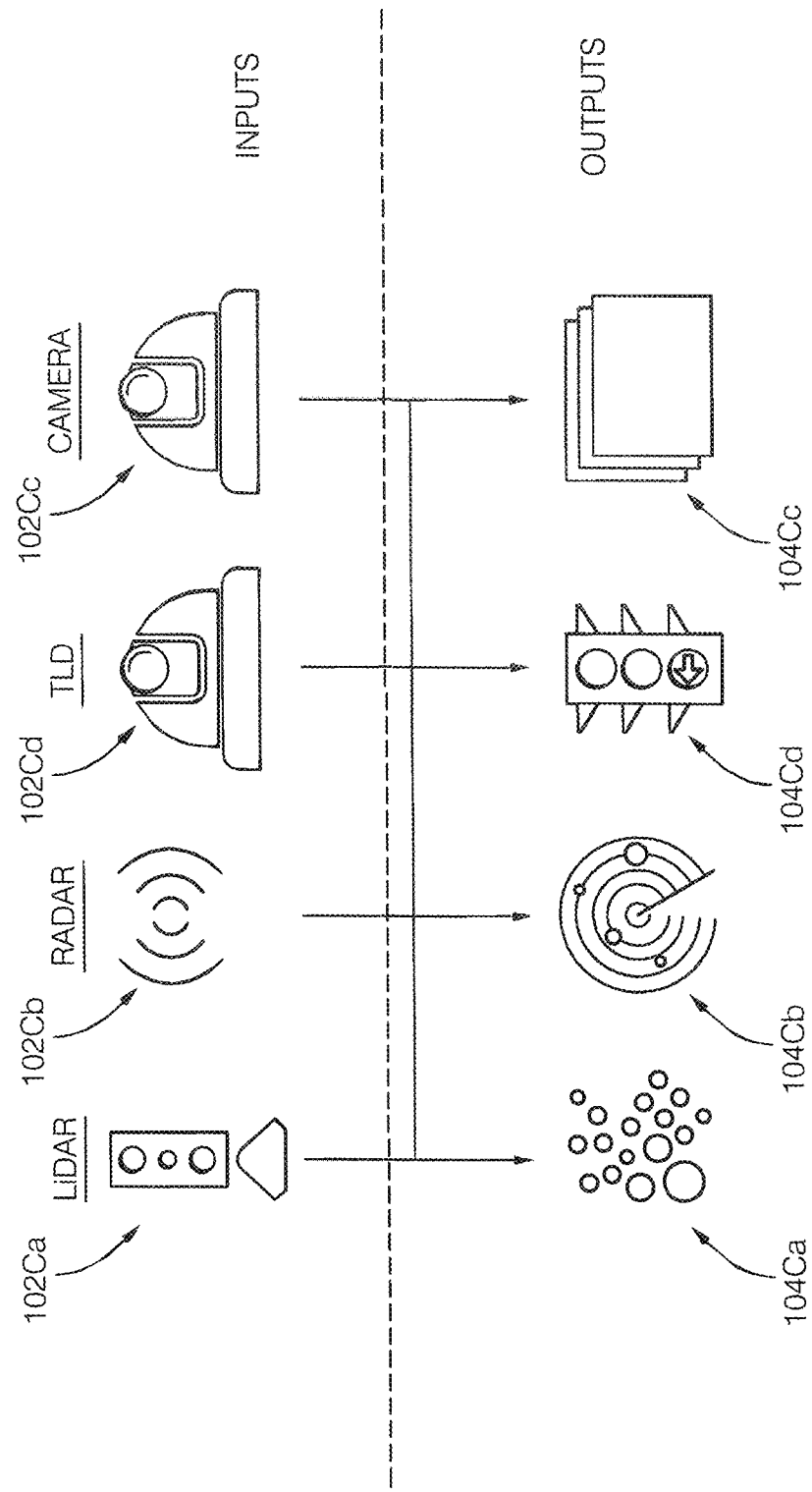
FIG. 5 shows an example of inputs and outputs that may be used by a perception module.

FIG. 5 shows an example of inputs 102Ca-d (e.g., sensors 121A shown in FIG. 1) and outputs 104Ca-d (e.g., sensor data) that is used by the perception module 102B (FIG. 4). One input 102Ca is a LiDAR (Light Detection and Ranging) system (e.g., LiDAR 123A shown in FIG. 1A). LiDAR is a technology that uses light (e.g., bursts of light such as infrared light) to obtain data about physical objects in its line of sight. A LiDAR system produces LiDAR data as output 104Ca. For example, LiDAR data is collections of 3D or 2D points (also known as a point clouds) that are used to construct a representation of the environment 190A.

Another input 102Cb is a RADAR system. RADAR is a technology that uses radio waves to obtain data about nearby physical objects. RADARs can obtain data about objects not within the line of sight of a LiDAR system. A RADAR system 102Cb produces RADAR data as output 104Cb. For example, RADAR data are one or more radio frequency electromagnetic signals that are used to construct a representation of the environment 190A.

Another input 102Cc is a camera system. A camera system uses one or more cameras (e.g., digital cameras using a light sensor such as a charge-coupled device (CCD)) to obtain information about nearby physical objects. A camera system produces camera data as output 104Cc. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 102Cd is a traffic light detection (TLD) system. A TLD system uses one or more cameras to obtain information about traffic lights, street signs, and other physical objects that provide visual navigation information. A TLD system produces TLD data as output 104Cd. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100A has access to all relevant navigation information provided by these objects. For example, the viewing angle of the TLD system may be about 120 degrees or more.

In some embodiments, outputs 104Ca-d are combined using a sensor fusion technique. Thus, either the individual outputs 104Ca-d are provided to other systems of the AV 100A (e.g., provided to a planning module 104B as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
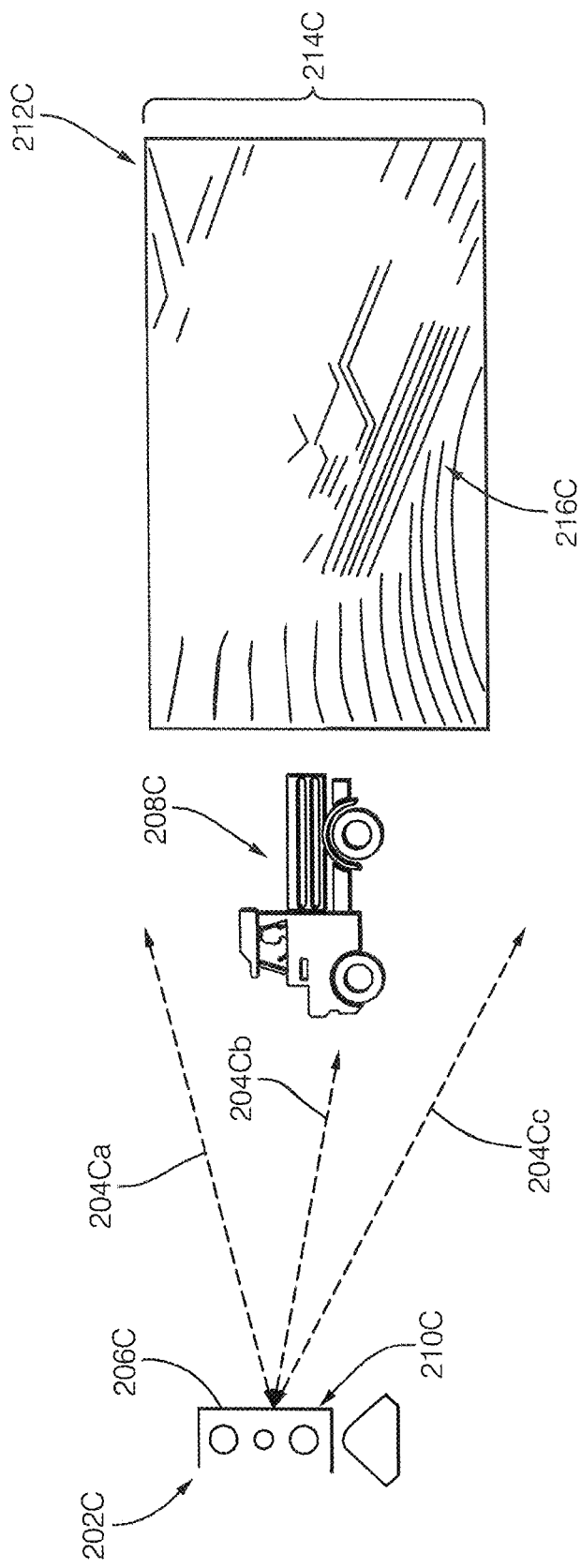
FIG. 6 shows an example of a LiDAR system.

FIG. 6 shows an example of a LiDAR system 202C (e.g., the input 102Ca shown in FIG. 5). The LiDAR system 202C emits light 204Ca-c from a light emitter 206C (e.g., a laser transmitter). Light emitted by a LiDAR system is typically not in the visible spectrum; for example, infrared light is often used. Some of the light 204Cb emitted encounters a physical object 208C (e.g., a vehicle) and reflects back to the LiDAR system 202C. (Light emitted from a LiDAR system typically does not penetrate physical objects, e.g., physical objects in solid form.) The LiDAR system 202C also has one or more light detectors 210C, which detect the reflected light. In an embodiment, one or more data processing systems associated with the LiDAR system generates an image 212C representing the field of view 214C of the LiDAR system. The image 212C includes information that represents the boundaries 216C of a physical object 208C. In this way, the image 212C is used to determine the boundaries 216C of one or more physical objects near an AV.

Figure 7:
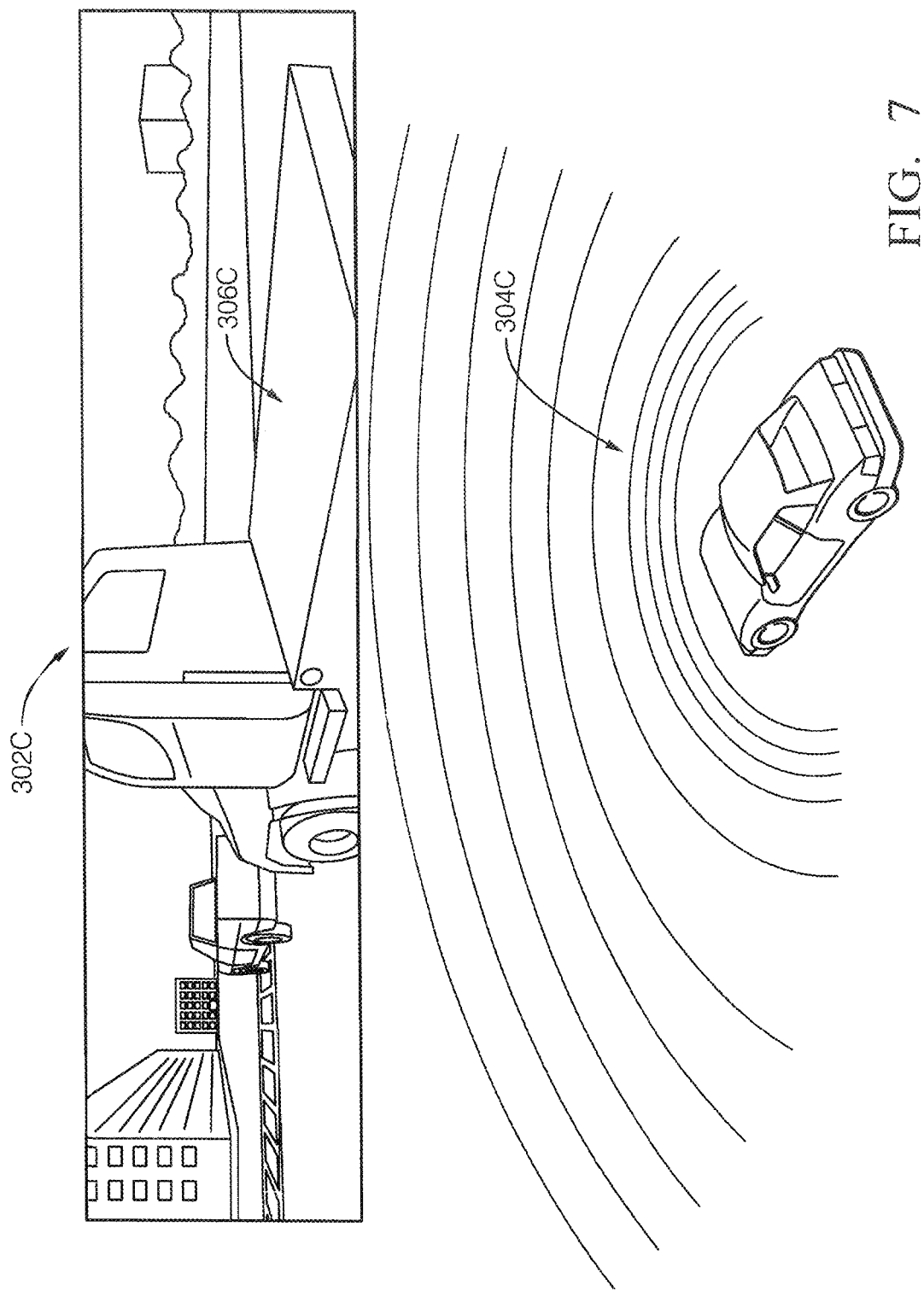
FIG. 7 shows the LiDAR system in operation.

FIG. 7 shows the LiDAR system 202C in operation. In the scenario shown in this figure, the AV 100A receives both camera system output 104Cc in the form of an image 302C and LiDAR system output 104Ca in the form of LiDAR data points 304C. In use, the data processing systems of the AV 100A compares the image 302C to the data points 304C. In particular, a physical object 306C identified in the image 302C is also identified among the data points 304C. In this way, the AV 100A perceives the boundaries of the physical object based on the contour and density of the data points 304C.

Figure 8:
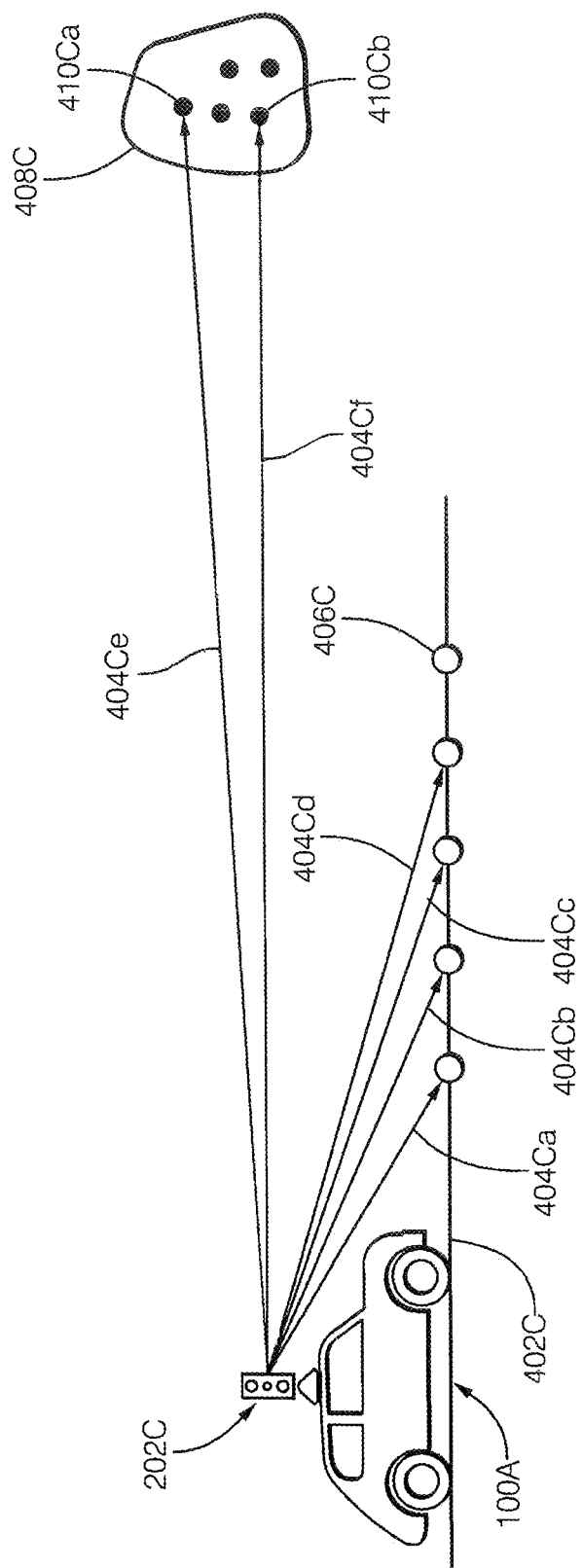
FIG. 8 shows the operation of the LiDAR system in additional detail.

FIG. 8 shows the operation of the LiDAR system 202C in additional detail. As described above, the AV 100A detects the boundary of a physical object based on characteristics of the data points detected by the LiDAR system 202C. As shown in FIG. 8, a flat object, such as the ground 402C, will reflect light 404Ca-d emitted from a LiDAR system 202C in a consistent manner. Put another way, because the LiDAR system 202C emits light using consistent spacing, the ground 402C will reflect light back to the LiDAR system 202C with the same consistent spacing. As the AV 100A travels over the ground 402C, the LiDAR system 202C will continue to detect light reflected by the next valid ground point 406C if nothing is obstructing the road. However, if an object 408C obstructs the road, light 404Ce-f emitted by the LiDAR system 202C will be reflected from points 410Ca-b in a manner inconsistent with the expected consistent manner. From this information, the AV 100A can determine that the object 408C is present.

Path Planning

Figure 9:
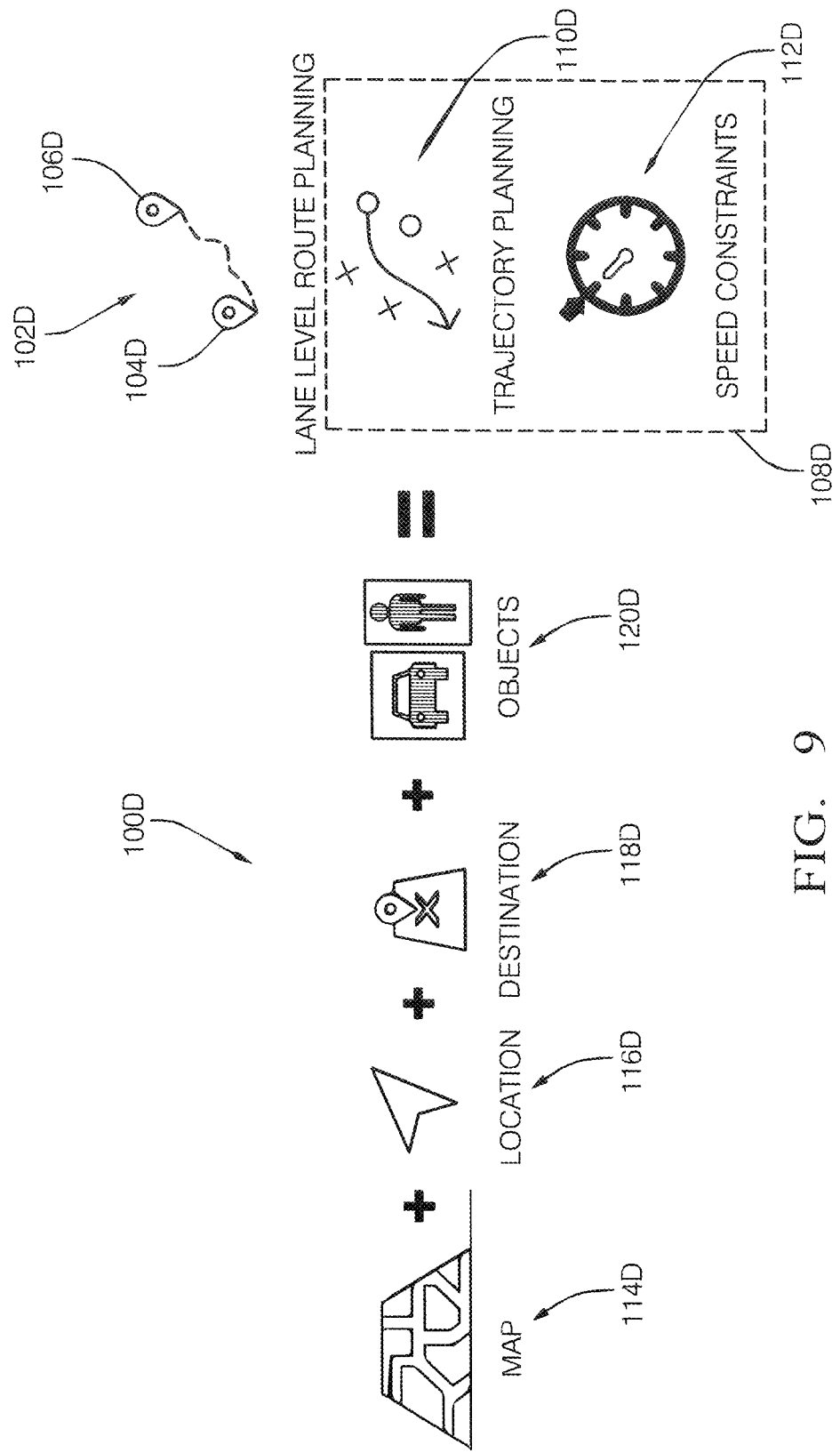
FIG. 9 shows a block diagram of the relationships between inputs and outputs of a planning module.

FIG. 9 shows a block diagram 100D of the relationships between inputs and outputs of a planning module 104B (e.g., as shown in FIG. 4). In general, the output of a planning module 104B is a route 102D from a start point 104D (e.g., source location or initial location), and an end point 106D (e.g., destination or final location). The route 102D is typically defined by one or more segments. For example, a segment is a distance to be traveled over at least a portion of a street, road, highway, driveway, or other physical area appropriate for automobile travel. In some examples, e.g., if the AV 100A is an off-road capable vehicle such as a four-wheel-drive (4WD) or all-wheel-drive (AWD) car, SUV, pick-up truck, or the like, the route 102D includes "off-road" segments such as unpaved paths or open fields.

In addition to the route 102D, a planning module also outputs lane-level route planning data 108D. The lane-level route planning data 108D is used to traverse segments of the route 102D based on conditions of the segment at a particular time. For example, if the route 102D includes a multi-lane highway, the lane-level route planning data 108D includes trajectory planning data 110D that the AV 100A can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 108D includes speed constraints 112D specific to a segment of the route 102D. For example, if the segment includes pedestrians or un-expected traffic, the speed constraints 112D may limit the AV 100A to a travel speed slower than an expected speed, e.g., a speed based on speed limit data for the segment.

In an embodiment, the inputs to the planning module 104B includes database data 114D (e.g., from the database module 110B shown in FIG. 4), current location data 116D (e.g., the AV position 118B shown in FIG. 4), destination data 118D (e.g., for the destination 112B shown in FIG. 4), and object data 120D (e.g., the classified objects 116B as perceived by the perception module 102B as shown in FIG. 4). In some embodiments, the database data 114D includes rules used in planning. Rules are specified using a formal language, e.g., using Boolean logic. In any given situation encountered by the AV 100A, at least some of the rules will apply to the situation. A rule applies to a given situation if the rule has conditions that are met based on information available to the AV 100A, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
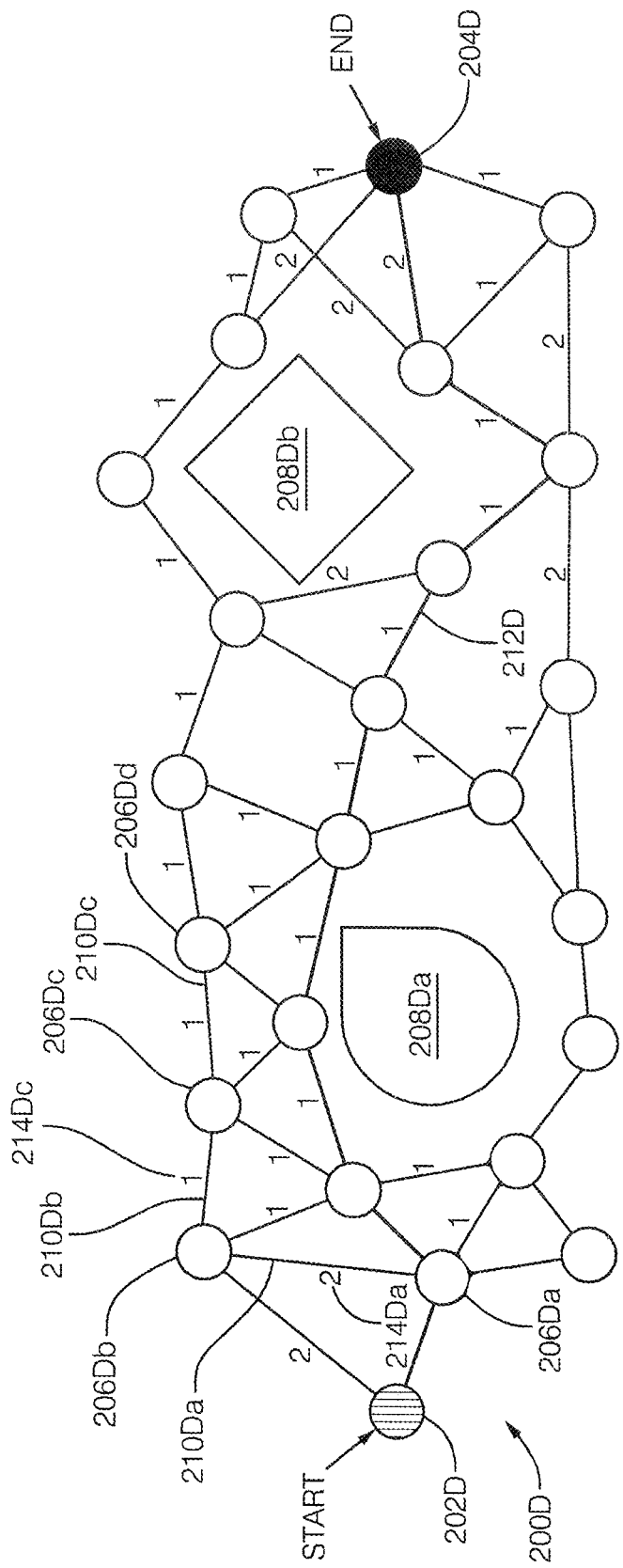
FIG. 10 shows a directed graph used in path planning.

FIG. 10 shows a directed graph 200D used in path planning, e.g., by the planning module 104B (FIG. 4). In general, a directed graph 200D like the one shown in FIG. 10 is used to determine a path between any start point 202D and end point 204D. In real-world terms, the distance separating the start point 202D and end point 204D may be relatively large (e.g., in two different metropolitan areas) or may be relatively small (e.g., two intersections abutting a city block or two lanes of a multi-lane road).

In an embodiment, the directed graph 200D has nodes 206Da-d representing different locations between the start point 202D and the end point 204D that could be occupied by an AV 100A. In some examples, e.g., when the start point 202D and end point 204D represent different metropolitan areas, the nodes 206Da-d represent segments of roads. In some examples, e.g., when the start point 202D and the end point 204D represent different locations on the same road, the nodes 206Da-d represent different positions on that road. In this way, the directed graph 200D includes information at varying levels of granularity. In an embodiment, a directed graph having high granularity is also a subgraph of another directed graph having a larger scale. For example, a directed graph in which the start point 202D and the end point 204D are far away (e.g., many miles apart) has most of its information at a low granularity and is based on stored data, but also includes some high granularity information for the portion of the graph that represents physical locations in the field of view of the AV 100A.

The nodes 206Da-d are distinct from objects 208Da-b which cannot overlap with a node. In an embodiment, when granularity is low, the objects 208Da-b represent regions that cannot be traversed by automobile, e.g., areas that have no streets or roads. When granularity is high, the objects 208Da-b represent physical objects in the field of view of the AV 100A, e.g., other automobiles, pedestrians, or other entities with which the AV 100A cannot share physical space. In an embodiment, some or all of the objects 208Da-b are a static objects (e.g., an object that does not change position such as a street lamp or utility pole) or dynamic objects (e.g., an object that is capable of changing position such as a pedestrian or other car).

The nodes 206Da-d are connected by edges 210Da-c. If two nodes 206Da-b are connected by an edge 210Da, it is possible for an AV 100A to travel between one node 206Da and the other node 206*db*, e.g., without having to travel to an intermediate node before arriving at the other node 206*db*. (When we refer to an AV 100A traveling between nodes, we mean that the AV 100A travels between the two physical positions represented by the respective nodes.) The edges 210Da-c are often bidirectional, in the sense that an AV 100A travels from a first node to a second node, or from the second node to the first node. In an embodiment, edges 210Da-c are unidirectional, in the sense that an AV 100A can travel from a first node to a second node, however the AV 100A cannot travel from the second node to the first node. Edges 210Da-c are unidirectional when they represent, for example, one-way streets, individual lanes of a street, road, or highway, or other features that can only be traversed in one direction due to legal or physical constraints.

In an embodiment, the planning module 104B uses the directed graph 200D to identify a path 212D made up of nodes and edges between the start point 202D and end point 204D.

An edge 210Da-c has an associated cost 214Da-b. The cost 214Da-b is a value that represents the resources that will be expended if the AV 100A chooses that edge. A typical resource is time. For example, if one edge 210Da represents a physical distance that is twice that as another edge 210*db*, then the associated cost 214Da of the first edge 210Da may be twice the associated cost 214*db* of the second edge 210*db*. Other factors that affect time include expected traffic, number of intersections, speed limit, etc. Another typical resource is fuel economy. Two edges 210Da-b may represent the same physical distance, but one edge 210Da may require more fuel than another edge 210*db*, e.g., because of road conditions, expected weather, etc.

When the planning module 104B identifies a path 212D between the start point 202D and end point 204D, the planning module 104B typically chooses a path optimized for cost, e.g., the path that has the least total cost when the individual costs of the edges are added together.

Autonomous Vehicle Control

Figure 11:
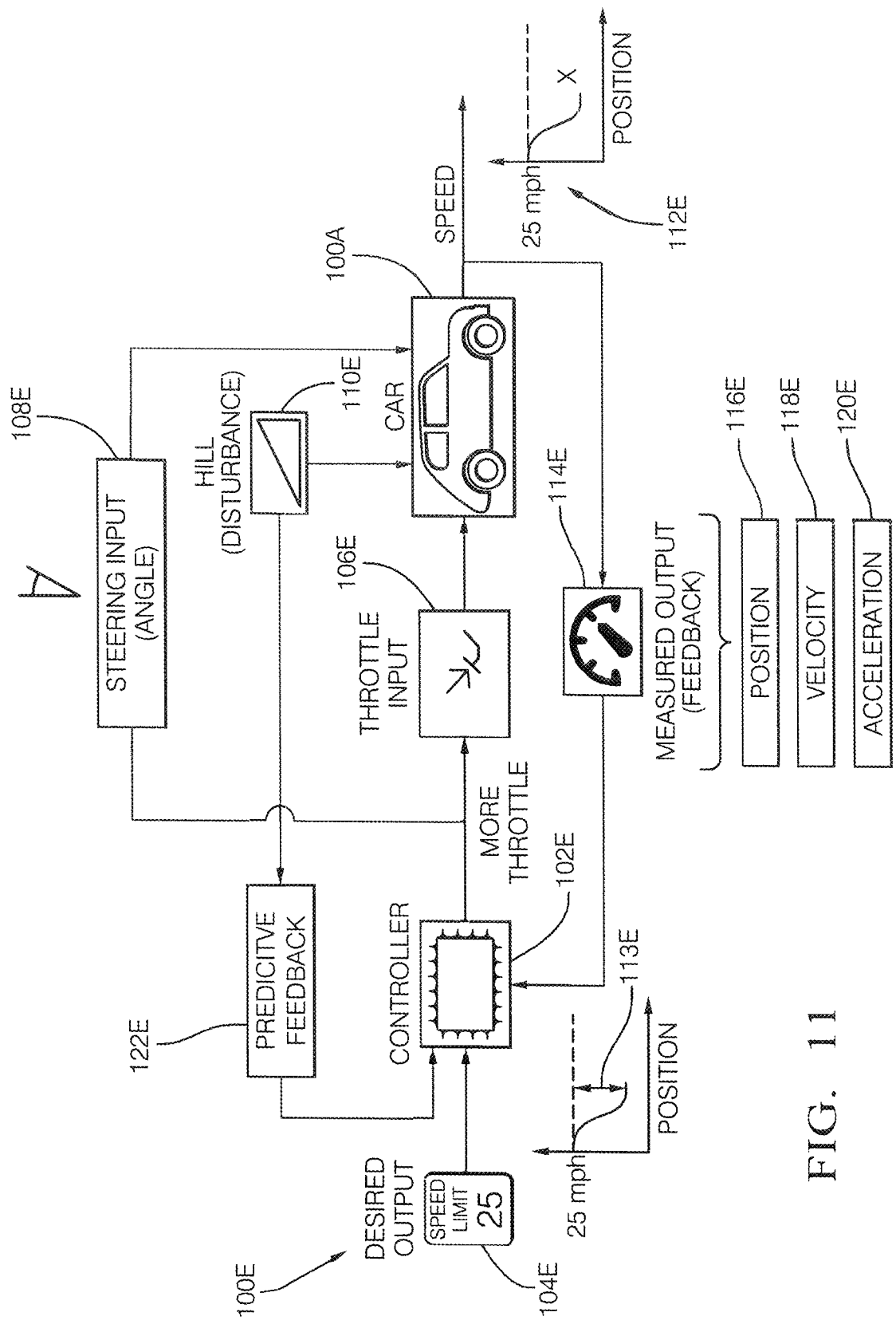
FIG. 11 shows a block diagram of the inputs and outputs of a control module.

FIG. 11 shows a block diagram 100E of the inputs and outputs of a control module 106B (e.g., as shown in FIG. 4). A control module operates in accordance with a controller 102E which includes, for example, one or more processors (e.g., one or more computer processors such as microprocessors or microcontrollers or both) similar to processor 304A, short-term and/or long-term data storage (e.g., memory random-access memory or flash memory or both) similar to main memory 306A, ROM 308A, and storage device 310A, and instructions stored in memory that carry out operations of the controller 102E when the instructions are executed (e.g., by the one or more processors).

In an embodiment, the controller 102E receives data representing a desired output 104E. The desired output 104E typically includes a velocity, e.g., a speed and a heading. The desired output 104E can be based on, for example, data received from a planning module 104B (e.g., as shown in FIG. 4). In accordance with the desired output 104E, the controller 102E produces data usable as a throttle input 106E and a steering input 108E. The throttle input 106E represents the magnitude in which to engage the throttle (e.g., acceleration control) of an AV 100A, e.g., by engaging the steering pedal, or engaging another throttle control, to achieve the desired output 104E. In some examples, the throttle input 106E also includes data usable to engage the brake (e.g., deceleration control) of the AV 100A. The steering input 108E represents a steering angle, e.g., the angle at which the steering control (e.g., steering wheel, steering angle actuator, or other functionality for controlling steering angle) of the AV should be positioned to achieve the desired output 104E.

In an embodiment, the controller 102E receives feedback that is used in adjusting the inputs provided to the throttle and steering. For example, if the AV 100A encounters a disturbance 110E, such as a hill, the measured speed 112E of the AV 100A is lowered below the desired output speed. In an embodiment, any measured output 114E is provided to the controller 102E so that the necessary adjustments are performed, e.g., based on the differential 113E between the measured speed and desired output. The measured output 114E includes measured position 116E, measured velocity 118E, (including speed and heading), measured acceleration 120E, and other outputs measurable by sensors of the AV 100A.

In an embodiment, information about the disturbance 110E is detected in advance, e.g., by a sensor such as a camera or LiDAR sensor, and provided to a predictive feedback module 122E. The predictive feedback module 122E then provides information to the controller 102E that the controller 102E can use to adjust accordingly. For example, if the sensors of the AV 100A detect ("see") a hill, this information can be used by the controller 102E to prepare to engage the throttle at the appropriate time to avoid significant deceleration.

Figure 12:
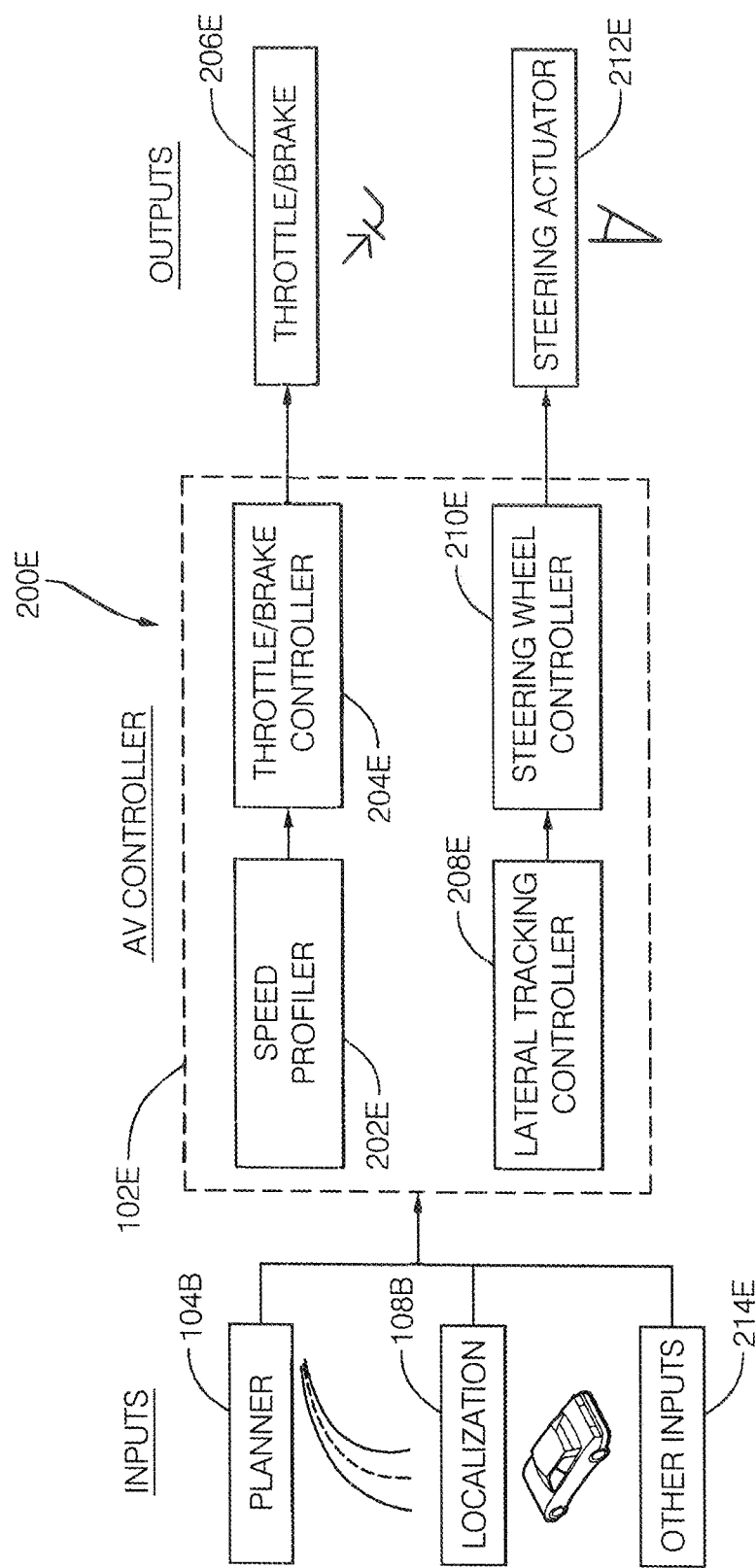
FIG. 12 shows a block diagram of the inputs, outputs, and components of a controller.

FIG. 12 shows a block diagram 200E of the inputs, outputs, and components of the controller 102E. The controller 102E has a speed profiler 202E which affects the operation of a throttle/brake controller 204E. For example, the speed profiler 202E instructs the throttle/brake controller 204E to engage acceleration or engage deceleration using the throttle/brake 206E depending on, e.g., feedback received by the controller 102E and processed by the speed profiler 202E.

The controller 102E also has a lateral tracking controller 208E which affects the operation of a steering controller 210E. For example, the lateral tracking controller 208E instructs the steering controller 210E to adjust the position of the steering angle actuator 212E depending on, e.g., feedback received by the controller 102E and processed by the lateral tracking controller 208E.

The controller 102E receives several inputs used to determine how to control the throttle/brake 206E and steering angle actuator 212E. A planning module 104B provides information used by the controller 102E, for example, to choose a heading when the AV 100A begins operation and to determine which road segment to traverse when the AV 100A reaches an intersection. A localization module 108B provides information to the controller 102E describing the current location of the AV 100A, for example, so that the controller 102E can determine if the AV 100A is at a location expected based on the manner in which the throttle/brake 206E and steering angle actuator 212E are being controlled. In an embodiment, the controller 102E receives information from other inputs 214E, e.g., information received from databases, computer networks, etc.

Autonomous Vehicle Route Modification

One aspect of controlling the AV 100A includes automatically determining the location of the AV 100A. Different driving scenarios may limit the availability of localization reference information, such as global navigation satellite system (GNSS) satellite signals or lane markings on a roadway. Controlling the AV 100A includes modifying the vehicle route by maneuvering the AV 100A in a way that increases the availability or detectability of such localization reference information, which increases the precision of the location determination.

A processor, such as the processor 146A or 304A mentioned above, uses at least one indication from at least one sensor, such as the sensor 121A mentioned above, to make the location determination and to maneuver the AV 100A if necessary or desired. The processor 146A will be included for discussion purposes but the processor 304A or a combination of such processors may be used in some embodiments. A single sensor 121A will be used for discussion purposes but more than one such sensor may be used in some embodiments. The sensor 121A is configured to detect the type of localization reference information used in a given scenario.

Figure 13:
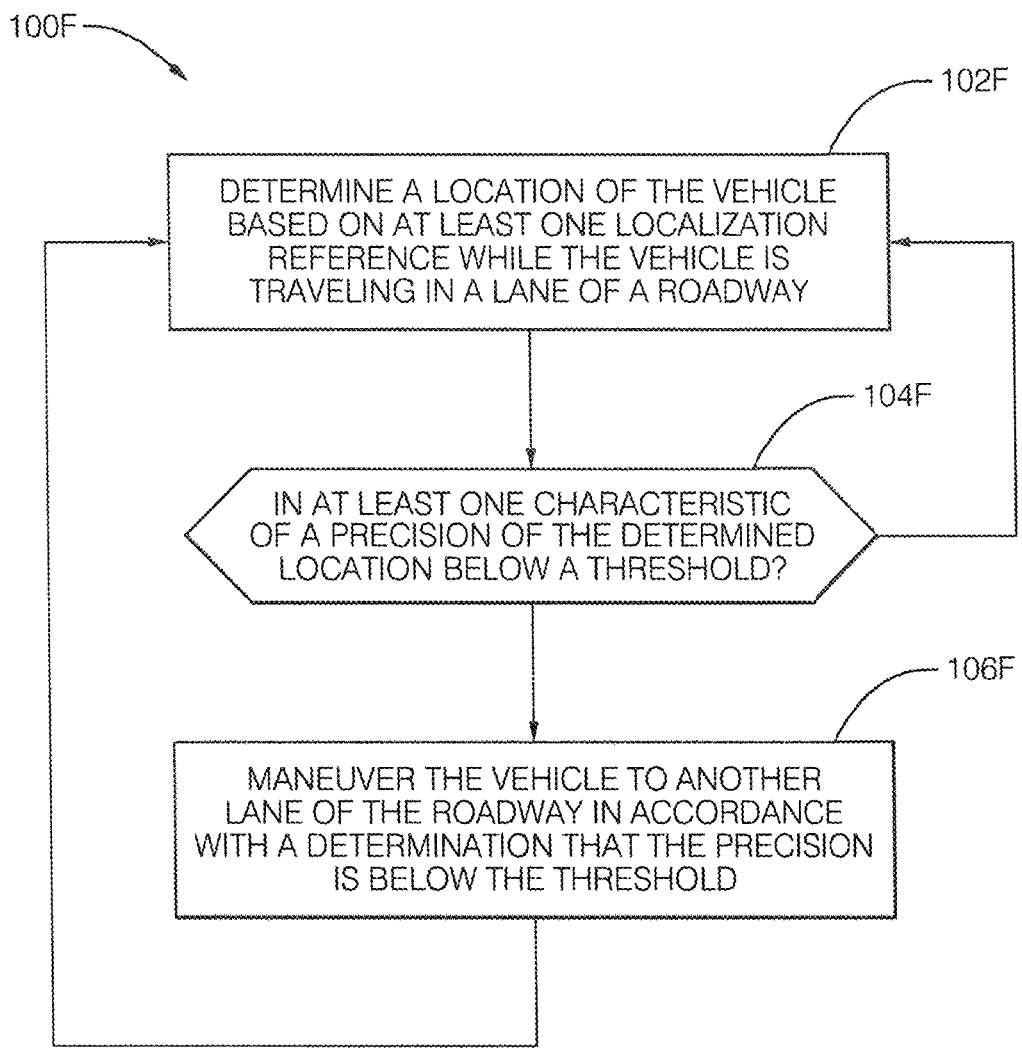
FIG. 13 is a flowchart diagram summarizing an example embodiment of a method of controlling a vehicle.

FIG. 13 is a flowchart diagram 100F that summarizes an example method of controlling the AV 100A including modifying how the AV 100A is traveling along a route to provide improved vehicle location information. At 102F, the processor 146A determines a location of the AV 100A with a first precision based on at least one localization reference while the AV 100A is traveling in a first lane of a roadway. At 104F, the processor 146A determines that at least one characteristic of the first precision is below a threshold. In embodiments in which the characteristic of interest is the precision, itself, the threshold may correspond to a level of certainty provided by the determined location. In embodiments in which the characteristic of interest corresponds to an amount of localization reference information used for determining the location, the threshold may correspond to a number of sources of such information. Given this description, those skilled in the art will be able to select an appropriate characteristic of the precision of a determined location and a corresponding threshold to meet the needs of their particular implementation.

At 106F, the processor 146A maneuvers the AV 100A to a second lane of the roadway based on the characteristic of the first precision being below the threshold. Maneuvering the AV 100A into the second lane allows the processor 146A to determine the location of the vehicle with a second precision while the AV 100A is traveling in the second lane. The second precision is above the threshold because of increased or improved availability of localization reference information while the vehicle is in the second lane compared to that which was available while the vehicle travels in the first lane.

The processor 146A obtains information regarding at least one localization reference from at least one of the sensors 121A that is configured to provide such information. For example, when the localization reference comprises lane markings sufficient to demarcate a lane on a roadway, the sensor 121A comprises a LIDAR sensor or vision system that is capable of detecting lane markings. In embodiments where the localization reference comprises a GNSS satellite signal, the sensor 121A is configured to detect such signals and the sensor 121A, the processor 146A, or both are configured to determine the location of the AV 100A based on such signals.

Figure 14:
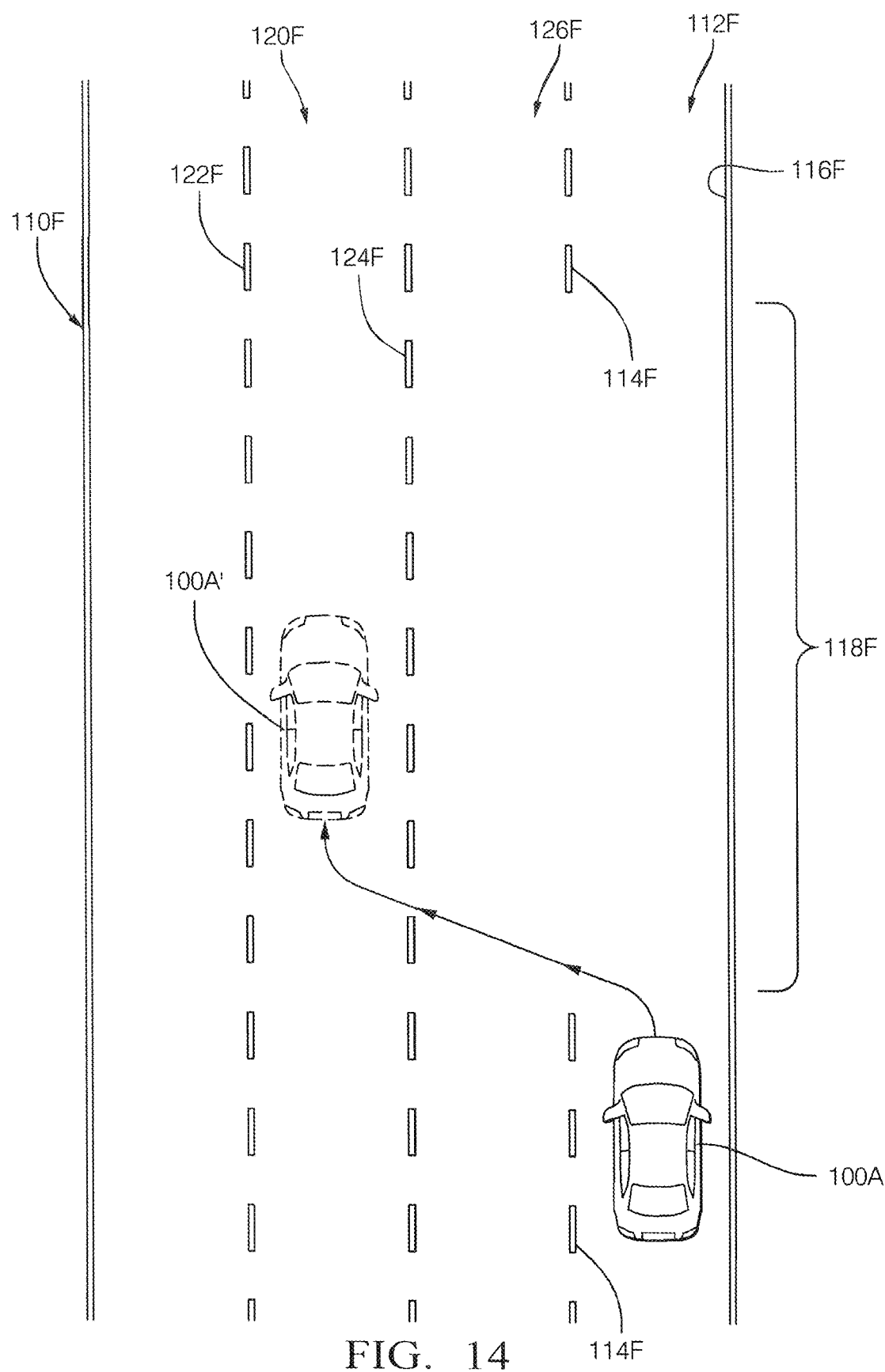
FIG. 14 schematically illustrates an example scenario including maneuvering a vehicle to improve a vehicle location determination based on lane markings.

FIG. 14 schematically illustrates an example scenario in which the processor 146A maneuvers the AV 100A to increase the amount of localization reference information useable for determining the vehicle location. In FIG. 14, the AV 100A is traveling along a roadway 110F in a first lane 112F. Lane markings 114F and 116F demarcate or establish the boundaries or borders along the sides of the lane 112F. A segment or portion 118F of the roadway 110F does not contain sufficient lane markings to demarcate the lane 112F to provide a desired precision when locating the AV 100A based upon the lane markings. In particular, the segment 118F does not have any of the lane markings 114F.

The processor 146A utilizes information regarding the lane markings to control the vehicle steering and speed, for example, to stay centered in the lane while traveling along a route to a destination. When traveling along the segment 118F, the processor 146A will not have sufficient lane marking information from the sensor 121A to make an accurate or precise location determination. In other words, when relying upon lane marking indications from the sensor 121A while traveling along the segment 118F in the first lane 112F, the determined location of the AV 100A will have a first precision that is below a threshold corresponding to a desired level of precision. In this example, the characteristic of the precision and the threshold correspond to whether lane markings are present to sufficiently demarcate the lane. Since the lane markings 114F are not present along the segment 118F, the precision of a location determination while the vehicle 100A is traveling in the lane 112F based on lane markings as the localization reference will not satisfy the first threshold. Under that circumstance, the processor 146A maneuvers the AV 100A into a second, different lane of the roadway 100F.

As shown in FIG. 14, the processor 146A maneuvers the AV 100A into a second lane 120F as shown at 100A'. The lane 120F includes lane markings 122F and 124F on both sides of that lane along the illustrated portion of the roadway 110F including the segment 118F. The processor 146A, therefore, can make a location determination with a second precision, which is higher than the first precision and the example characteristic of the second precision will be above the threshold. Since the amount of localization reference information that the first precision was based on while the vehicle 100A was traveling in the first lane 112F is less than the amount of localization reference information provided by the lane markings 122F and 124F in the second lane 120F, maneuvering the AV 100A into the second lane 120F provides an improved vehicle location determination. In this example scenario, more localization reference information corresponds to an increased precision of the location determination.

Figure 15:
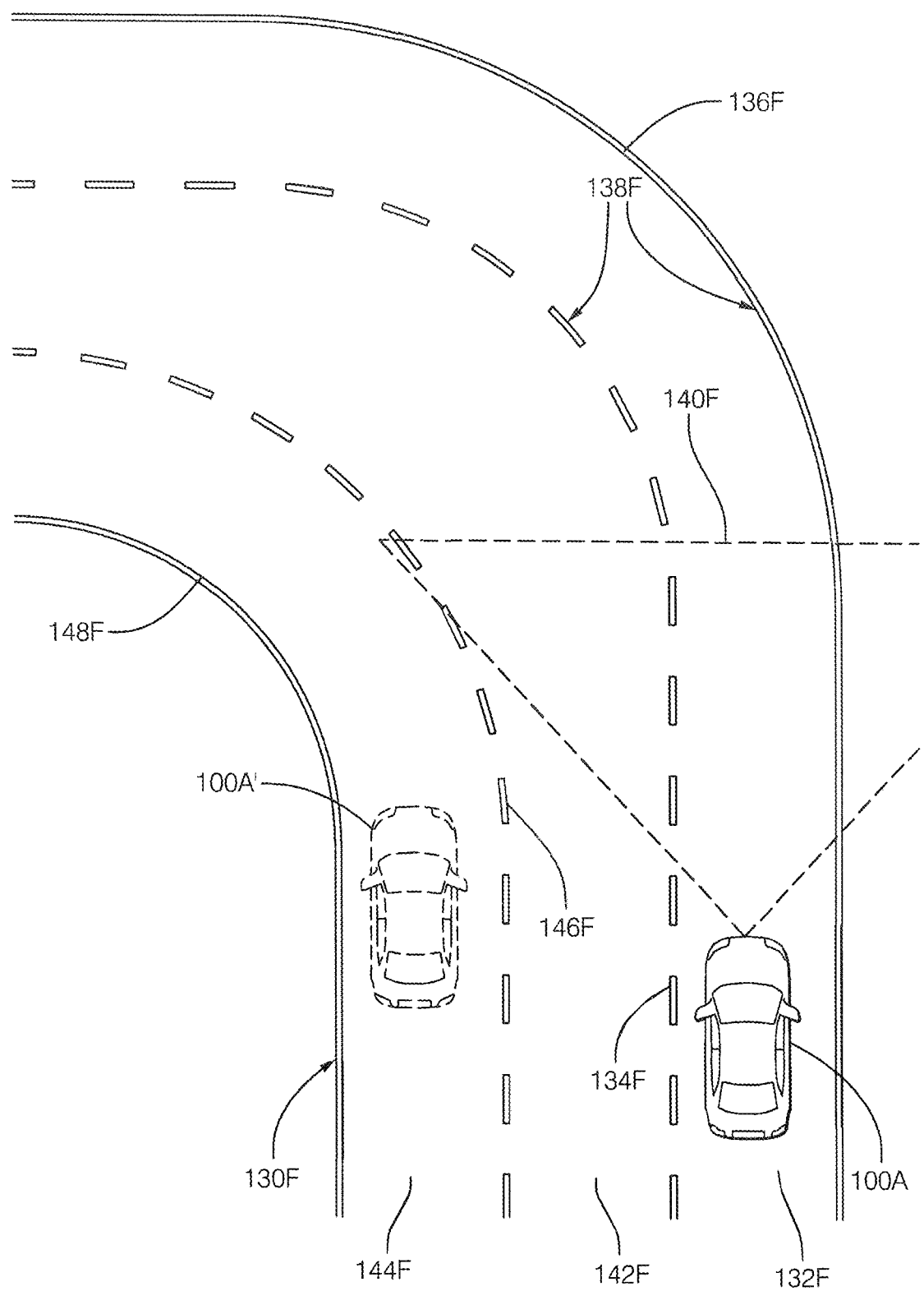
FIG. 15 schematically illustrates another example scenario including maneuvering a vehicle to improve a vehicle location determination based on lane markings.

FIG. 15 illustrates another example scenario in which the processor 146A utilizes lane marking information for determining the location of the AV 100A at least for purposes of maintaining an appropriate position within the lane. In FIG. 15, the AV 100A is traveling along a roadway 130F that includes a bend or curve. Having sufficient lane marking information while the AV 100A is traveling along a curve in a roadway ensures that the AV 100A can properly navigate the roadway 130F. The AV 100A is shown currently traveling in a first lane 132F that includes lane markings 134F and 136F. A segment of the roadway 130F shown at 138F does not include lane markings to sufficiently demarcate the first lane 132F.

The sensor 121A has a field of vision schematically shown at 140F. The sensor 121A provides an indication to the processor 146A regarding the presence of lane markings within the field of vision 140F. The processor 146A determines that there are insufficient lane markings along the segment 138F to determine the vehicle location along that segment with a desired level of precision. In some instances, the processor 146A makes such a determination based upon at least one location determination regarding the AV 100A on the segment 138F.

The processor 146A maneuvers the AV 100A into a second, different lane of the roadway 130F to achieve a location determination having a second precision that is better compared to the precision available in the lane 132F. In the scenario shown in FIG. 15, a lane 142F has lane markings 146F and the lane markings 134F. Since the lane markings 134F are not present along the segment 138F, the processor 146A determines that another lane 144F having lane markings 146F and 148F would be a better choice for traveling around the illustrated curve and along the segment 138F. Accordingly, the processor 146A maneuvers the AV 100A into the lane 144F as show at 100A' at least for traveling along the curve shown in FIG. 15.

Figure 16:
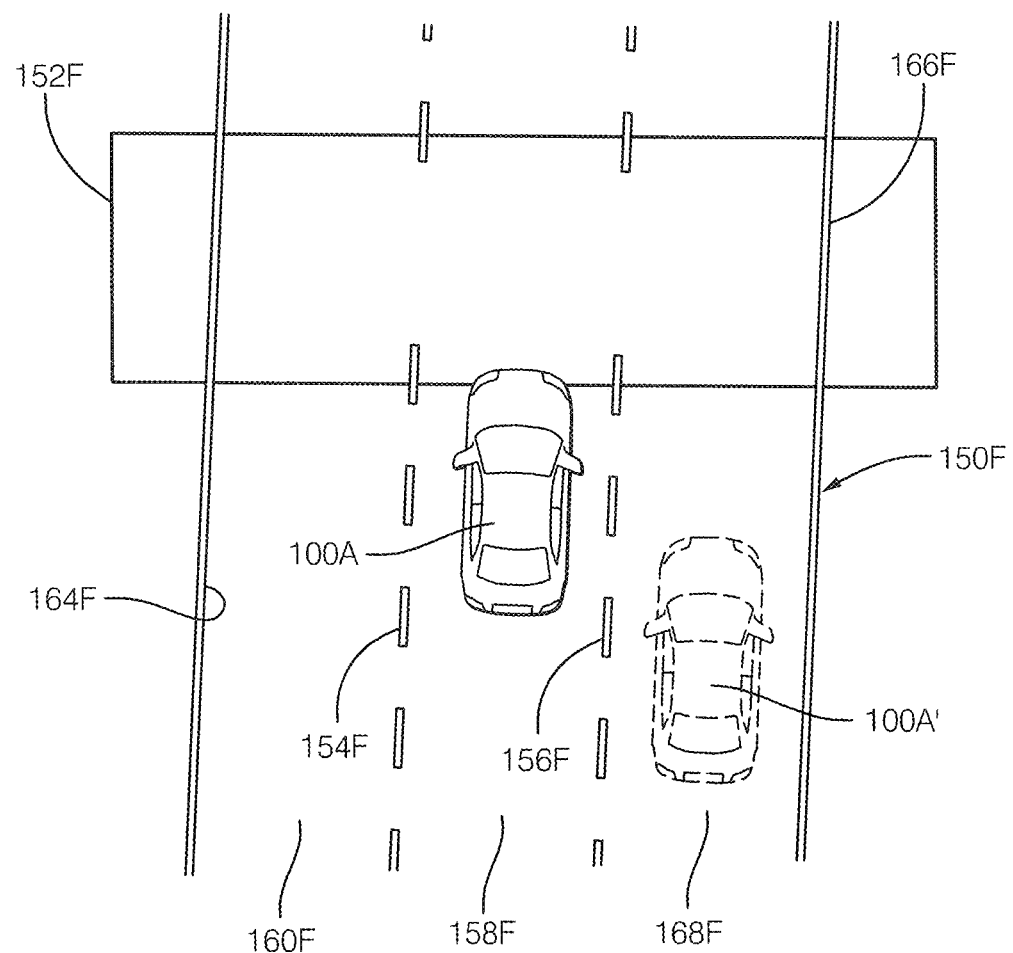
FIG. 16 schematically illustrates another example scenario including maneuvering a vehicle to improve a vehicle location determination based on lane markings.

FIG. 16 shows another example scenario in which lane marking information is relied upon for determining the location of the AV 100A. A roadway 150F includes a segment where the AV 100A passes underneath a structure 152F, such as a bridge or overpass. Having sufficient lane marking information along that segment of the roadway 150F may be necessary when the processor 146A otherwise relies upon GNSS satellite information to determine the location of the AV 100A. Underneath the structure 152F, such signals may not be available and the processor 146A relies upon lane marking information to maintain accurate vehicle location information.

The roadway 150F includes lane markings 154F and 156F that demarcate the sides or edges of a lane 158F. The lane markings 154F and 156F are not present underneath the structure 152F. Another lane 160F is demarcated by lane markings 164F and 154F. At least the lane marking 164F is available underneath the structure 152F. Similarly, a lane marking 166F is available along the entire illustrated portion of the roadway 150F along one side of a lane 168F. Under such a scenario, the processor 146A determines that there is more lane marking information available in the lanes 160F and 168F compared to the lane 158F. Therefore, the processor 146A maneuvers the AV 100A as shown at 100A' into the lane 168F for purposes of traveling beneath the structure 152F. Even though lane markings are not available on both sides of the lane 168F, there is at least one lane marking available, which provides improved precision over that which would be available while traveling in the lane 158F.

In the scenarios shown in FIGS. 14-16, the localization reference information includes at least lane marking information that demarcates the lanes on a roadway. In such situations, the processor 146A is configured to select a second or different lane and maneuver the AV 100A into such a lane based on information regarding at least one other localization reference that is detectable by the sensor 121A while the AV 100A is in such a second lane but not in the first lane. The information used by the processor 146A for selecting a lane under such circumstances includes at least one of an output from the sensor 121A corresponding to detecting lane markings of the second lane, predetermined map information regarding lane markings in a vicinity of the AV 100A, and stored information regarding the lane markings from at least one previous trip along the roadway. Some example embodiments include the processor 146A using a combination of such information.

For example, as the AV 100A travels along the roadway, the sensor 121A provides the processor 146A an indication regarding the presence or absence of lane markings within the field of view 140 on an ongoing basis. The processor 146A dynamically responds to the sensor indication and maneuvers the AV 100A into different lanes as may be useful under the particular circumstances.

Predetermined map information, which includes locations where particular segments of lanes do not have sufficient lane markings, may be available from a variety of sources. The processor 146A in some embodiments has access to such information either stored in memory on the AV 100A or through a subscription, for example, to an external database or service that is accessible using wireless communication techniques. The processor 146A in such embodiments essentially keeps track of the map information regarding the vicinity of the AV 100A location and uses that to determine where a lane change will provide more or better lane marking information.

The processor 146A is configured in some embodiments to store information regarding lane markings during at least one trip along a roadway including locations where the sensor 121A indicates that lane markings are insufficient to demarcate a lane, for example. The processor 146A in some embodiments also stores information regarding locations where a lane change resulted in increasing the precision of a location determination. During a subsequent trip along the same roadway, the processor 146A uses the previously stored data and current vehicle location information to maneuver the AV 100A among lanes on the roadway to avoid traveling along a segment of a lane where the lane markings are unavailable or insufficient for adequately demarcating the lane.

In some situations, the first lane of the roadway that does not have lane markings sufficient to demarcate that lane along a segment of a route that the AV 100A is following is a preferred lane for overall route planning purposes. The processor 146A is configured to determine when to maneuver the AV 100A back into the first lane from the second lane once sufficient lane markings are available to demarcate the first lane. This occurs, for example, after travelling past a segment of the roadway on which the first lane does not have adequate lane markings. The processor 146A determines if lane markings are detectable by the sensor 121A in a nearby segment of the first lane while the AV 100A is traveling in the second lane. The processor 146A maneuvers the AV 100A from the second lane into the first lane when such lane markings are available in the nearby segment of the first lane.

The processor 146A may determine when lane markings are detectable by the sensor 121A in the first lane based on indications from the sensor 121A regarding the ability of the sensor 121A to currently detect such lane markings. In some situations, the processor 146A uses predetermined map information or information stored from a previous trip along that roadway to make such a determination. The processor 146A is therefore capable of causing the AV 100A to follow a preplanned, preferred route and maintain a desired level of precision for location determinations along that route by maneuvering the AV 100A into different lanes as may be needed along the preplanned route.

The processor 146A, in some embodiments, utilizes GNSS satellite information as the localization reference information. When the localization reference comprises GNSS satellite signals, the characteristic of interest of the precision with which a location determination is made or can be made corresponds to a number of GNSS satellite signals available or detectable by one or more sensors 121A onboard the AV 100A. The threshold corresponds to, for example, a desired minimum number of satellite signals simultaneously detectable by the sensor 121A. The processor 146A maneuvers the AV 100A into a lane along a current segment of a roadway to increase the availability of satellite signals for purposes of making location determinations when the currently detected number of satellite signals is below the threshold.

Figure 17:
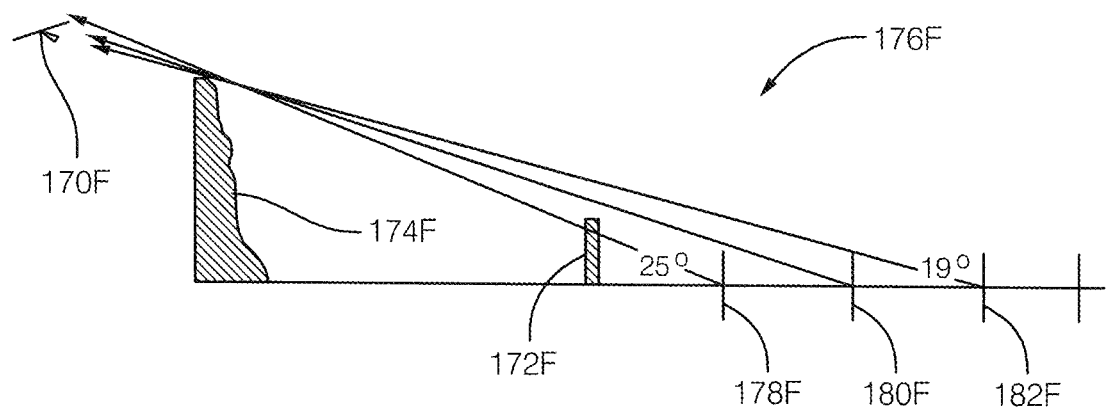
FIG. 17 schematically illustrates selected features of an example embodiment that includes using satellite signals as localization reference information.

As schematically shown in FIG. 17, a low horizon GNSS satellite 170F may be outside of the look angle or detection angle of the sensor 121A on the AV 100A depending on the location of the AV 100A. Obstructions 172F and 174F nearby a roadway 176F may prevent the sensor 121A from detecting a signal from the satellite 170F depending on the lane in which the AV 100A is traveling. Possible lane positions are schematically shown at 178F, 180F, and 182F. When the AV 100A is traveling along a lane 178F, the obstruction 172F blocks the satellite signal from the GNSS satellite 170F. The obstruction 172F may be a building, for example, or a portion of the landscape such as trees, along the roadway 176F. The obstruction 174F is further from the roadway 176F but is larger and, therefore, may still impede satellite signal reception when the AV 100A is in certain positions along the roadway 176F.

As schematically shown in FIG. 17, when the AV 100A is traveling in a lane at 180F or 182F, neither obstruction 172F or 174F will prevent the sensor 121A from having a clear line of sight or look angle for detecting a signal from the GNSS satellite 170F. The processor 146A, therefore, maneuvers the AV 100A out of the lane 178F and into one of the lanes 180F or 182F when traveling along a segment of the roadway 176F where the obstructions 172F or 174F may impede the sensor 121A from detecting a satellite signal.

FIG. 18 illustrates an example scenario in which the AV 100A is traveling along a roadway 190F in a lane 192F. Several obstructions 194F, 196F, and 198F are situated nearby the roadway 190F close to the lane 192F. When the AV 100A is traveling along the lane 192F, one or more of those obstructions may impede the ability of the sensor 121A to receive a signal from a GNSS satellite. The processor 146A determines the location of the AV 100A based on a number of GNSS satellite signals that are detectable by the sensor 121A. That determination has a first precision based on a first number of such signals that can be detected by the sensor 121A. The processor 146A maneuvers the AV 100A into a second, different lane 200F as shown at 100A', based on the first precision being below the corresponding threshold, to increase the number of GNSS satellite signals detectable by the sensor 121A. When a second, larger number of such signals are detectable by the sensor 121A, the AV 100A location determination can be made with a second, higher precision compared to a first precision based on the first number of available satellite signals.

The processor 146A selects the lane to maneuver the AV 100A into by determining a position or location of an obstruction and selecting a lane further from that obstruction to reduce the likelihood that the obstruction will interfere with satellite signal reception by the sensor 121A. In some embodiments, the processor 146A makes this determination based on information from the sensor 121A. In such embodiments, the sensor 121A is capable of detecting the position of an obstruction relative to the AV 100A. For example, the sensor 121A may include RADAR, LiDAR, or ultrasound sensing technologies for detecting an obstruction in or nearby the roadway. The processor 146A determines a position of the obstruction relative to the vehicle and selects a lane based on that determined position. The processor 146A selects a second lane to increase a distance between the AV 100A and the obstruction. By doing so, the processor 146A increases a number of GNSS satellites detectable by the sensor 121A from a first number while the AV 100A is traveling in the first lane to a second, larger number while the AV 100A is traveling in the second lane.

Other types of data that may be used by the processor 146A for identifying or locating obstructions and selecting a second lane includes data stored by the processor 146A during previous trips along a roadway and predetermined map data that provides indications of locations of obstructions relative to one or more lanes of a roadway.

In some embodiments, the processor 146A selects a second lane for increasing the number of satellite signals available to the sensor 121A based upon ephemeris data regarding positions of GNSS satellites. Such data is available and may be provided to the processor 146A through a subscription service, for example.

FIG. 9 schematically illustrates another scenario in which GNSS satellite information may be limited based upon at least one obstruction while AV 100A is traveling in a lane 210F on a roadway 212F. A first vehicle 214F is in a lane 215F and a second vehicle 216F is in another lane 218F. Those vehicles 214F and 216F will obstruct the ability of the sensor 121A to detect low horizon GNSS satellite signals when the AV 100A is situated between them and they are respectively on opposite sides of the AV 100A. The processor 146A is configured to alter the manner in which the AV 100A is traveling along the roadway by changing a speed with which the AV 100A travels to avoid being situated between the vehicles 214F and 216F.

For example, the processor 146A may determine that the AV 100A is situated between the vehicles 214F and 216F based upon information from the sensor 121A that detects the presence of such vehicles along the roadway 212F. At the same time, the processor 146A recognizes that the number of satellite signals available to or detectable by the sensor 121A is below a desired number. The processor 146A alters a speed of the AV 100A to change the position of the AV 100A relative to or one or both of the obstructing vehicles 214F and 216F until those vehicles no longer prevent the sensor 121A from detecting GNSS satellite signals.

When the AV 100A is in either of the positions shown in FIG. 7F, the vehicles 214F and 216F do not interfere with GNSS satellite signal reception. Once in such a position, the processor 146A readjusts the speed of the AV 100A as may be needed to continue travelling along the lane 210F at a preferred speed, which may be based on a posted speed limit of the roadway 212F or maintaining a selected distance from the vehicles 214F and 216F.

The processor 146A is configured in this example embodiment to determine when the obstructing vehicles 214F and 216F are on opposite sides of the AV 100A and that maneuvering the AV 100A into an adjacent lane on the roadway 212F is not possible. Under those circumstances, the processor 146A does not attempt a maneuver as described previously but, instead, accelerates or decelerates the AV 100A while staying in the lane 210F. This is another example way in which the processor 146A controls movement of the AV 100A to ensure that adequate localization reference information is available for making a location determination at a desired precision level.

The techniques and system features used in the example scenarios discussed above are combined in some embodiments, such as determining the vehicle location based on a combination of GNSS satellite and lane marking information. The disclosed features and techniques may be combined in various ways to realize a variety of embodiments.

Although GNSS satellite signal and lane markings are used as localization references in the example embodiments described above, those embodiments and others are not necessarily limited to such information. For example, other embodiments include other types of localization references, such as localization objects or buildings that have sufficiently detectable features to allow using an iterative closest point algorithm to determine position information.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
    at least one processor configured to:
        determine a location of a vehicle with a first precision based on lane markings detected by at least one sensor while the vehicle is traveling in a first lane of a roadway, the first precision corresponding to a first amount of lane markings detectable while the vehicle is traveling in the first lane;
        determine that the first precision is below a threshold; and
        based on the first precision being below the threshold:
            identify a second lane of the roadway that includes lane markings, the second lane being another lane of the roadway and adjacent to the first lane;
            determine whether the lane markings for the second lane provide a greater amount of localization reference information than the lane markings for the first lane based on stored information from a previous trip of the vehicle along the roadway indicating a second amount of lane markings of the second lane detected by the vehicle during the previous trip; and
            based on a determination that the lane markings for the second lane provide a greater amount of localization reference information than the lane markings for the first lane, maneuver the vehicle to the second lane of the roadway.

2. The system of claim 1, wherein:
    the at least one processor is further configured to determine the location of the vehicle with a second precision based on the lane markings for the second lane while the vehicle is traveling in the second lane; and
    the second precision is above the threshold.

3. The system of claim 1, wherein the first precision and the second precision corresponds to a presence of the lane markings.

4. The system of claim 1, wherein:
    the first lane is a preferred lane for at least a current segment of a route that the vehicle is following; and
    the at least one processor is further configured to:
        subsequent to maneuvering the vehicle to the second lane, determine if lane markings for the first lane are detectable in a nearby segment of the first lane while the vehicle is in the second lane; and
        responsive to a determination that the lane markings for the first lane are detectable in the nearby segment of the first lane, maneuver the vehicle from the second lane into the first lane.

5. The system of claim 1, wherein:
    the at least one processor is configured to select the second lane based on a determination that, while the vehicle is traveling in the second lane, determining the location of the vehicle will be based on a second, larger amount of lane markings.

6. A method comprising:
   while a vehicle is traveling in a first lane of a roadway, determining a location of the vehicle with a first precision based on lane markings detected by at least one sensor, the first precision corresponding to a first amount of lane markings detectable while the vehicle is traveling in the first lane;
   determining that the first precision is below a threshold; and
   based on the first precision being below the threshold:
      identifying a second lane of the roadway that includes lane markings, the second lane being another lane of the roadway and adjacent to the first lane;
      determining whether the lane markings for the second lane provide a greater amount of localization reference information than the lane markings for the first lane based on stored information from a previous trip of the vehicle along the roadway indicating a second amount of lane markings of the second lane detected by the vehicle during the previous trip; and
      based on a determination that the lane markings for the second lane provide a greater amount of localization reference information than the lane markings for the first lane, maneuvering the vehicle to the second lane of the roadway.

7. The method of claim 6, the method further comprising determining, while the vehicle is traveling in the second lane, the location of the vehicle with a second precision based on the lane markings for the second lane, the second precision being above the threshold.

8. The method of claim 6, wherein the second precision corresponds to a presence of the lane markings.

9. The method of claim 1, wherein:
   the first lane is a preferred lane for at least a current segment of a route that the vehicle is following; and
   the method further comprises:
      subsequent to maneuvering the vehicle to the second lane, determining if lane markings for the first lane are detectable in a nearby segment of the first lane while the vehicle is in the second lane; and
      responsive to determining that the lane markings for the first lane are detectable in the nearby segment of the first lane, maneuvering the vehicle from the second lane into the first lane.

10. The method of claim 6, wherein:
   the second lane is selected based on a determination that, while the vehicle is traveling in the second lane, determining the location of the vehicle will be based on a second, larger amount of lane markings.

11. A computer-readable storage medium comprising computer-executable instructions that, when executed, cause at least one processor to:
   determine a location of a vehicle with a first precision based on lane markings detected by at least one sensor while the vehicle is traveling in a first lane of a roadway, the first precision corresponding to a first amount of lane markings detectable while the vehicle is traveling in the first lane;
   determine that the first precision is below a threshold; and
   based on the first precision being below the threshold:
      identify a second lane of the roadway that includes lane markings, the second lane being another lane of the roadway and adjacent to the first lane;
      determine whether the lane markings for the second lane provide a greater amount of localization reference information than the lane markings for the first lane based on stored information from a previous trip of the vehicle along the roadway indicating a second amount of lane markings of the second lane detected by the vehicle during the previous trip; and
      based on a determination that the lane markings for the second lane provide a greater amount of localization reference information than the lane markings for the first lane, maneuver the vehicle to the second lane of the roadway.

12. The computer-readable storage medium of claim 11, wherein:
   the computer-readable storage medium comprises additional computer-executable instructions that, when executed, cause the at least one processor to determine the location of the vehicle with a second precision based on the lane markings for the second lane while the vehicle is traveling in the second lane; and
   the second precision is above the threshold.

13. The computer-readable storage medium of claim 11, wherein the second precision corresponds to a presence of the lane markings.

14. The computer-readable storage medium of claim 11, wherein:
   the first lane is a preferred lane for at least a current segment of a route that the vehicle is following; and
   the computer-readable storage medium comprises additional computer-executable instructions that, when executed, cause the at least one processor to:
      subsequent to maneuvering the vehicle to the second lane, determine if lane markings for the first lane are detectable in a nearby segment of the first lane while the vehicle is in the second lane; and
      responsive to determining that the lane markings for the first lane are detectable in the nearby segment of the first lane, maneuver the vehicle from the second lane into the first lane.

15. The computer-readable storage medium of claim 11, wherein:
   the first precision is based on a first amount of lane markings detectable while the vehicle is traveling in the first lane; and
   the computer-readable storage medium comprises additional computer-executable instructions that, when executed, cause the at least one processor to select the second lane based on a determination that, while the vehicle is traveling in the second lane, determining the location of the vehicle will be based on a second, larger amount of lane markings.

* * * * *

UNITED STATES PATENT AND TRADEMARK OFFICE
CERTIFICATE OF CORRECTION

Page 1 of 1

PATENT NO. : 12,091,016 B2
APPLICATION NO. : 17/811434
DATED : September 17, 2024
INVENTOR(S) : Nandita Mangal et al.

It is certified that error appears in the above-identified patent and that said Letters Patent is hereby corrected as shown below:

In the Claims

Column 24, Claim 3, Line 47: after "wherein", delete "the first precision and"

Signed and Sealed this
Eighth Day of April, 2025

Coke Morgan Stewart
*Acting Director of the United States Patent and Trademark Office*